US007903308B2

(12) United States Patent
Commander et al.

(10) Patent No.: US 7,903,308 B2

(45) Date of Patent: Mar. 8, 2011

(54) SECURITY DEVICE BASED ON CUSTOMIZED MICROPRISM FILM

(75) Inventors: Lawrence George Commander, Hampshire (GB); Christopher John Eastell, Wiltshire (GB); Roland Isherwood, Hampshire (GB)

(73) Assignee: De La Rue International Limited, Basingstoke (GB)

(*) Notice: Subject to any disclaimer, the term of this patent is extended or adjusted under 35 U.S.C. 154(b) by 642 days.

(21) Appl. No.: 11/883,574

(22) PCT Filed: Mar. 7, 2006

(86) PCT No.: PCT/GB2006/000816

§ 371 (c)(1), (2), (4) Date: Sep. 4, 2007

(87) PCT Pub. No.: WO2006/095161

PCT Pub. Date: Sep. 14, 2006

(65) Prior Publication Data

US 2008/0231976 A1 Sep. 25, 2008

(30) Foreign Application Priority Data

Mar. 10, 2005 (GB) .................................. 0504959.8

(51) Int. Cl.
*G03H 1/00* (2006.01)

(52) U.S. Cl. ............................................... 359/2; 283/85

(58) Field of Classification Search ........ 359/2; 283/72, 283/86, 85

See application file for complete search history.

(56) References Cited

U.S. PATENT DOCUMENTS

| | | | | |
|---|---|---|---|---|
| 3,689,346 | A | 9/1972 | Rowland | |
| 3,817,596 | A | 6/1974 | Tanaka | |
| 4,576,850 | A | 3/1986 | Martens | |
| 4,601,861 | A | 7/1986 | Pricone et al. | |
| 5,101,184 | A | 3/1992 | Antes | |
| 5,248,544 | A | 9/1993 | Kaule | |
| 5,591,527 | A | 1/1997 | Lu | |
| 6,157,486 | A * | 12/2000 | Benson et al. | 359/498 |
| 6,200,399 | B1 | 3/2001 | Thielman | |
| 6,356,389 | B1 | 3/2002 | Nilsen et al. | |
| 6,720,072 | B1 | 4/2004 | Hinterwaldner et al. | |
| 2002/0119304 | A1 | 8/2002 | Arney et al. | |
| 2005/0068625 | A1 | 3/2005 | Schilling et al. | |
| 2007/0253072 | A1 * | 11/2007 | Mullen et al. | 359/641 |

FOREIGN PATENT DOCUMENTS

| | | | |
|---|---|---|---|
| DE | 25 40 846 | A1 | 3/1977 |
| DE | 42 26 907 | A1 | 2/1994 |
| DE | 297 24 867 | U1 | 12/2004 |
| EP | 0 269 329 | A2 | 6/1988 |
| EP | 0 360 969 | A1 | 4/1990 |
| EP | 0 860 298 | A2 | 8/1998 |
| EP | 0 885 705 | A1 | 12/1998 |
| EP | 1 141 480 | B1 | 10/2001 |

(Continued)

*Primary Examiner* — Alessandro Amari

(74) *Attorney, Agent, or Firm* — Oliff & Berridge, PLC

(57) ABSTRACT

A security device comprises at least two regions, each region comprising a prismatic surface structure defining an array of substantially planar facets. Each region forms a reflector due to total internal reflection when viewed at least one first viewing angle and is transparent when viewed at at least one second viewing angle. The said at least one first viewing angle of one region is different from the at least one first viewing angle of the other region.

60 Claims, 39 Drawing Sheets

FOREIGN PATENT DOCUMENTS

| | | | |
|---|---|---|---|
| GB | 2 360 250 | A | 9/2001 |
| WO | WO 83/00659 | A1 | 3/1983 |
| WO | WO 92/04692 | A1 | 3/1992 |
| WO | WO 93/24333 | A1 | 12/1993 |
| WO | WO 94/01291 | A1 | 1/1994 |
| WO | WO 97/19821 | A1 | 6/1997 |
| WO | WO 99/36806 | A1 | 7/1999 |
| WO | WO 00/39391 | A1 | 7/2000 |
| WO | WO 02/058928 | A1 | 8/2002 |
| WO | WO 03/054297 | A2 | 7/2003 |
| WO | WO 03/055691 | A1 | 7/2003 |
| WO | WO 03/055692 | A1 | 7/2003 |
| WO | WO 03/095188 | A2 | 11/2003 |
| WO | WO 2004/061489 | A1 | 7/2004 |
| WO | WO 2004/062938 | A2 | 7/2004 |

* cited by examiner

SECURITY DEVICE BASED ON CUSTOMIZED MICROPRISM FILM

The present invention relates to improvements in security devices that can be used in varying shapes and sizes for various authenticating or security applications, particularly a device comprising a prismatic film customised to display identifying information.

BACKGROUND

Security documents such as banknotes now frequently carry optically variable devices such as diffraction gratings or holographic optical microstructures as a security feature against copy and counterfeit. This has been motivated by the progress in the fields of computer-based desktop publishing and scanning, which renders conventional security print technologies such as intaglio and offset printing more prone to attempts to replicate or mimic. Examples of such holographic structures and their manufacturing techniques can be found in EP0548142 and EP0632767 filed in the name of De La Rue Holographics Ltd.

The use of diffraction gratings or holographic optical microstructures has become more prevalent in recent years and consequently the underlying component technologies/sciences have become increasingly accessible to would be counterfeiters.

Optically variable devices can also be created using non-holographic micro-optics. One advantage is that mechanical copying of micro-optical components, such as microprisms, typically with a size range of 1-50 μm, is very difficult to achieve because any variation in dimension or geometrical distortion leads to a decline or extinction of the required optical properties.

The use of prismatic films to generate optical security devices is known. A grooved surface, a ruled array of tetrahedra, square pyramids or corner cube structures are examples of prismatic structures observed in such films. There is a significant volume of prior art on devices that utilise the retroreflective nature of prismatic structures. One example is EP1047960, which describes a reflective article with a concealed retroreflective pattern in which indicia are substantially hidden under normal viewing conditions but easily detectable under retroreflective lighting conditions. The general use of such devices is limited because in order to ensure correct verification of the hidden image the use of a directional light beam source is required which is typically in the form of handheld viewer.

An alternative application of prismatic structures in the field of optical security articles has been described in U.S. Pat. No. 5,591,527. In the preferred embodiment a substantially totally internal reflecting film, defined by a series of parallel linear prisms having planar facets, is adhered to a security document. A film comprising a plurality of parallel linear prisms can be used to produce an optically variable device using the phenomena of total internal reflection (TIR). A cross-section of a prismatic film defined by a series of parallel linear prisms is illustrated in FIG. 1. First consider the case where the film in FIG. 1 is viewed such that the light is incident upon the smooth surface i.e. the prismatic array is in a “prisms-down” configuration relative to the viewer. When the angle between facets is 90°, light incident upon the smooth surface at an angle $\theta_1$ to the normal of the smooth surface (ray 1) will be totally internally reflected at each face of the prism and exit back through the smooth surface when the incident light is refracted by the smooth surface and then strikes the facets of the structured surface (points a and b) at angles $\alpha_1$ and $\alpha_2$ respectively, with respect to the normal of the facet, which are greater than the critical angle. The critical angle for a material, in air, is defined as the arc sine of the reciprocal of the index of refraction of the material. In addition, a significant portion of the incident light striking the smooth surface at an angle $\theta_2$ to the normal of the smooth surface which produces refracted light that strikes the structured surface, for example at point c, at an angle, $\beta_1$, less than the critical angle will be transmitted through the prismatic film (ray 2) and the remainder of the incident light will be reflected by the smooth surface. The switch angle, $\theta_{spd}$, for the prisms-down configuration is the smallest angle of incidence with respect to the normal of the smooth surface at which the incident light is not totally internally reflected within the prism structure. The prismatic film in FIG. 1, when in the prisms-down configuration, exhibits an optical switch by being alternatively totally reflecting (bright “metallic” appearance) at angles of view less than the switch angle or transparent at angles of greater than the switch angle. In the totally reflecting state the film will exhibit a bright “metallic” appearance (i.e. exhibiting a lustre similar to that of metals), which is solely a result of the high reflectivity of the prismatic film. The film does not require a physical metallic layer, for example a vapour deposited metallised layer or a layer of metallic ink, to generate the bright metallic appearance.

In order to achieve TIR at the planar facet boundary in FIG. 1 the prism material must have a higher refractive index than the neighbouring material contacting the facets. U.S. Pat. No. 5,591,527 indicates that the change in refractive index at the planar facet boundary in FIG. 1 should be at least 0.1RI units and more preferably at least 0.7RI units. In the security article in U.S. Pat. No. 5,591,527 a significant refractive index difference is obtained by using a separation layer between the adhesive and the prismatic film to provide air pockets. In one embodiment the separation layer is provided in the form of an image in order to create a “flip-flop” image that is only viewable when the angle of view is greater than the critical angle.

Now consider the case where the film in FIG. 1 is viewed such that the light is incident upon the faceted surface i.e. the prismatic array is in a “prisms-up” configuration relative to the viewer. Light incident at an angle $\theta_3$ to the normal of the smooth surface (ray 3) is refracted by the faceted surface and then strikes the smooth boundary (point d) at an angle $\beta_2$, with respect to the normal of the smooth boundary, which is less than the critical angle and therefore a significant portion of the incident light is transmitted through the prismatic film. In contrast light incident in a direction substantially parallel to the normal of the faceted surface (ray 4) at an angle $\theta_4$ to the smooth surface is refracted by the faceted surface and then strikes the smooth boundary (point e) at an angle $\alpha_3$, with respect to the normal of the smooth boundary, which is greater than the critical angle and therefore undergoes TIR and exits the prismatic film through the faceted surface at point f. The switch angle, $\theta_{spu}$, for the prisms-up configuration is the smallest angle of incidence with respect to the normal of the smooth surface at which incident light is totally reflected by the prismatic structure. It should be noted that for the prisms-up configuration TIR only occurs for a limited angular range above $\theta_{spu}$, and for angles of incidence exceeding this range the film switches back to being substantially transparent. This is discussed in more detail later in the specification with reference to FIG. 5. The prismatic film in FIG. 1, when in the prisms-up configuration, exhibits an optical switch by being substantially transparent at angles of view less than the switch angle and becoming totally reflecting (bright “metallic” appearance) at the switch angle and for a limited range above the switch angle and returning to a transparent appearance for angles of view exceeding this range.

A similar type of device to the one described in U.S. Pat. No. 5,591,527 is disclosed in patent applications WO03055692 and WO04062938. In this example a light-transmitting film with a high refractive index is applied to a product or document where one surface of the high refractive film has a prismatic structure. The film is placed over an image in the form of a legend, picture or pattern such that when viewed along the normal to the document the prismatic film is opaque and conceals the image but when viewed at an oblique angle the prismatic film is light transmitting allowing the image to be observed.

The security devices described in U.S. Pat. No. 5,591,527, WO03055692, and WO04062938 exhibit a distinct optical switch that is viewable in ambient light and therefore provides an advantage over the retroreflective devices that typically requires handheld viewers. However the devices described in the cited prior art contain only a simple on-off switch, i.e. the regions containing the prismatic structures switch from totally reflecting to transparent at the same specified angle, which limits the extent to which they can be customised. This limitation provides an advantage to the counterfeiter who only requires to produce one generic prismatic film that can be used to counterfeit a whole range of security devices. The current invention provides an optically variable security device based on a prismatic film where different regions of the prismatic film exhibit a different optically variable effect enabling the creation of a unique customised prismatic film for each security application.

SUMMARY OF INVENTION

In accordance with the present invention, a security device comprises at least two regions, each region comprising a prismatic surface structure defining an array of substantially planar facets, wherein each region forms a reflector due to total internal reflection when viewed at least one first viewing angle and is transparent when viewed at least one second viewing angle, and wherein the said at least one first viewing angle of one region is different from the at least one first viewing angle of the other region.

The viewing angle can be varied by tilting and/or rotating the device.

In one example, the security device comprises a substantially transparent layer having a localised prismatic surface structure consisting of an array of substantially planar facets on one side and a second localised prismatic surface structure consisting of an array of substantially planar facets on the other side. The relative position of the prismatic structures can be such that they do not overlap or alternatively areas of overlap can be used. On viewing the device the prismatic structured regions on the far side of the device are in the prisms-down configuration and will switch from totally reflecting (brightly metallic) to transparent as the sample is tilted away from the normal but the prismatic structured regions on the near side of the device are in the prisms-up configuration and will exhibit the inverse switch from transparent to totally reflecting (brightly metallic) as the sample is tilted away from the normal. If the prismatic array in the prisms-down configuration is replicated as an identifying image and the prismatic array in the prisms-up configuration is replicated as the background a positive brightly reflecting image with a metallic appearance can be made to switch by tilting to a negative image with a background which is brightly reflective with a metallic appearance.

In an alternative embodiment the prismatic structures on either side of the transparent layer can be arranged such that in certain regions of the device they overlap. In the overlap region the prismatic structures on the near surface can be used to control the illumination angle of the light hitting the prismatic structures on the far surface and thereby changing the angle at which the prismatic structures on the far surface switch from being totally reflecting to transparent thus allowing a more complex image-switching device to be generated.

Examples of prismatic structures suitable for this first aspect of the current invention include but are not limited to a series of parallel linear prisms with planar facets arranged to form a grooved surface, a ruled array of tetrahedra, an array of square pyramids, an array of corner-cube structures, and an array of hexagonal-faced corner-cubes.

An array of parallel linear prisms is one of the preferred prismatic structures for the current invention because it has very high reflection efficiency and therefore will appear strongly "metallic" within the angular range where the conditions for TIR are satisfied. For a device containing a one-dimensional linear prism structure the viewing angle at which TIR occurs will depend on the angle of rotation of the device in its plane. Two-dimensional prismatic structures such as square pyramids and corner-cubes are less sensitive to the rotation of the substrate, but such structures are not as efficient reflectors as an array of parallel linear prisms with TIR failing at some locations on the facets. However the switch from the reflective to the transparent state as the angle of view is changed is still distinct enough to enable two-dimensional prismatic structures to be used in the optically variable device of the first aspect of the current invention.

In further examples of a second aspect, the security device comprises a substantially transparent layer having a localised prismatic surface structure preferably comprising of two or more arrays of a prismatic structure, where the reflective properties of the arrays are dependent on the angle of rotation of the layer and where the arrays are rotated relative to each other within the plane of the layer. A preferred prismatic structure for the second aspect of the invention is a series of parallel linear prisms. The brightly reflecting to transparent switch of a prismatic film comprising of an array of parallel linear prisms is sensitive to the rotation of the film and is dependent on the angle between the viewing direction and the long axis of the linear prisms. Referring to the cross-section in FIG. 1, when viewed normally in the prisms-down configuration the film will be brightly reflecting with a "metallic" appearance. FIG. 2 illustrates a film comprising a linear prism array based on the cross-section in FIG. 1 in the prisms-down configuration. If the film is now tilted with the viewing direction perpendicular to the long axes of the linear prisms (direction A) the film will switch from brightly reflecting to transparent when the angle of view is greater than the switching angle ($\theta_{spd}$) defining TIR. However if the film is rotated such that the viewing direction is parallel to the long axes of the linear prisms (direction B) the film remains brightly reflecting with a "metallic" appearance at all viewing angles.

This variability with viewing direction can be used to customise the security device by having two arrays of a series of parallel linear prisms where the arrays are rotated relative to each other by substantially 90° within the plane of the substrate. One of the linear prism arrays could be applied in the form of an identifying image and the second array will form the background. When viewed at normal incidence the device will appear uniform as both the background and the image will be brightly reflecting with a "metallic" appearance. If the device is now tilted, with the viewing direction perpendicular to the long axes of the linear prisms forming the image, the image will switch from brightly reflecting to transparent when the angle of view is greater than the switching angle ($\theta_{spd}$) defining TIR, but the background will remain "metallic" at all viewing angles. However if the device is rotated and tilted, such that the viewing direction is parallel to the long axes of the linear prisms forming the image, the image remains brightly reflecting with a "metallic" appearance at all viewing angles and the background will switch from brightly reflecting to transparent when the angle of view is greater than the switching angle (θspd) defining TIR. In this manner the security device can be made to reveal a negative "metallic" latent image on tilting at one rotational orientation and a positive "metallic" latent image when tilting at a second substantially perpendicular rotational orientation.

In an alternative embodiment of the second aspect of the invention the security device comprises multiple arrays of a series of parallel linear prisms where the arrays are rotated relative to each other within the plane of the substrate. For an array of parallel linear prisms in the prisms-down configuration, as the angle between the viewing direction and the perpendicular to the long axes of the linear prism increases the switching angle ($\theta_{spd}$) increases i.e. becomes increasingly oblique. The arrays can form separate images or component parts of one image and the fact that each array can exhibit a different switching angle enables more complex image-switching devices to be generated.

It should be noted that the configurations described in the first and second aspects could be combined to enable further image switching devices to be generated.

The security device of the current invention can be used to authenticate a variety of substrates but is particularly suitable for application to flexible substrates such as paper and polymeric films and in particular banknotes. The security device can be manufactured into patches, foils, stripes, strips or threads for incorporation into plastic or paper substrates in accordance with known methods. Such a device could be arranged either wholly on the surface of the document, as in the case of a stripe or patch, or may be visible only partly on the surface of the document in the form of a windowed security thread. In a further embodiment the device could be incorporated into the document such that regions of the device are viewable from the both sides of the document. Methods for incorporating a security device such that it is viewable from both sides of the document are described in EP1141480 and WO03054297. Alternatively, the security device of the current invention could be incorporated into a transparent window of a polymer banknote.

Some examples of security devices and methods according to the invention will now be described with reference to the accompanying drawings, in which:—

Figure 17A:
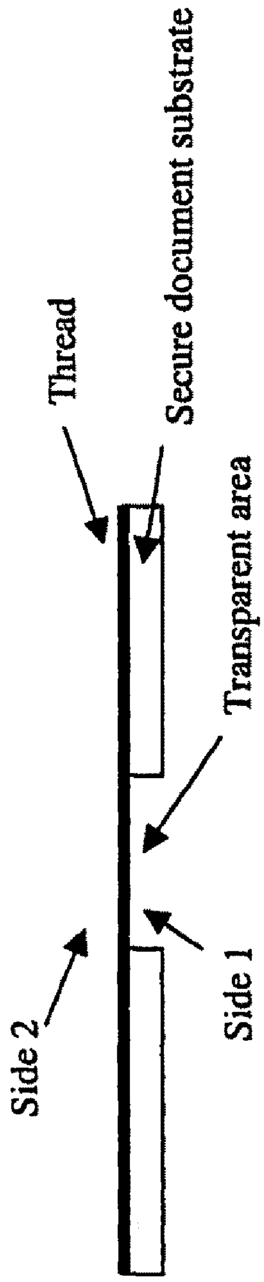
Figure 17B:
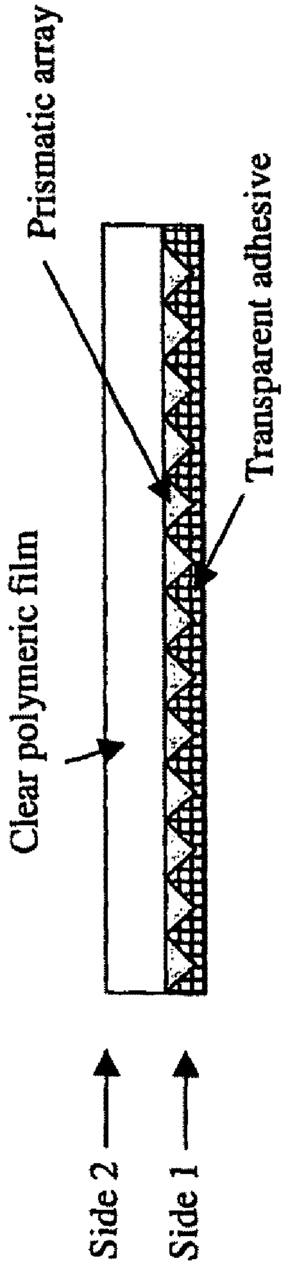
Figure 18:
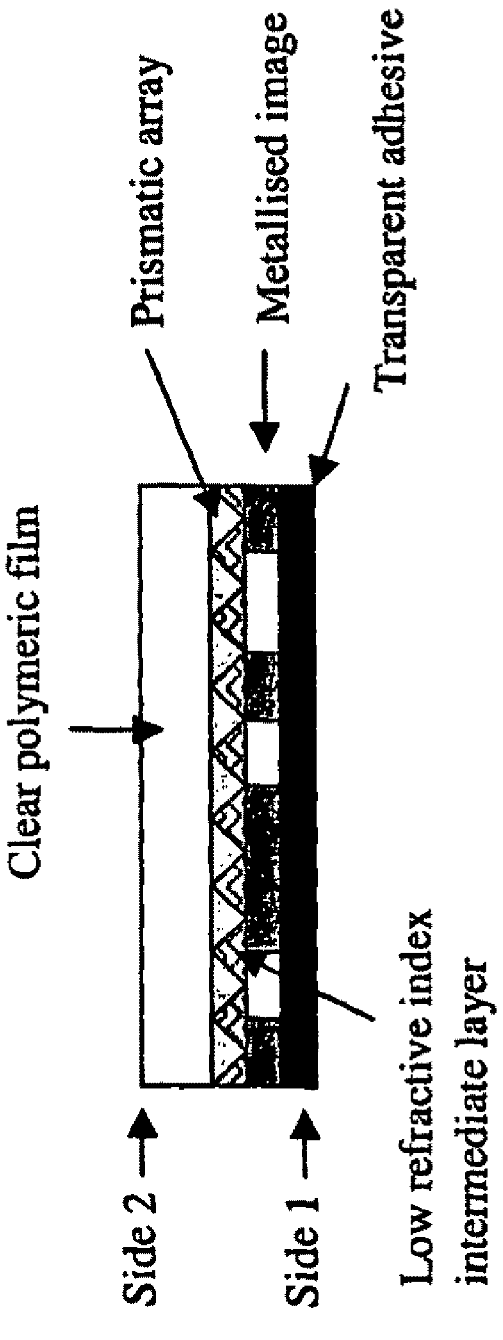

FIGS. 17*a* and 17*b* illustrate a security device incorporated into a document such that regions of the device are viewable from both sides of the document;

FIG. 18 is a cross-section through another example of the security device for use in the arrangement of FIG. 17*a;*

Figure 19:
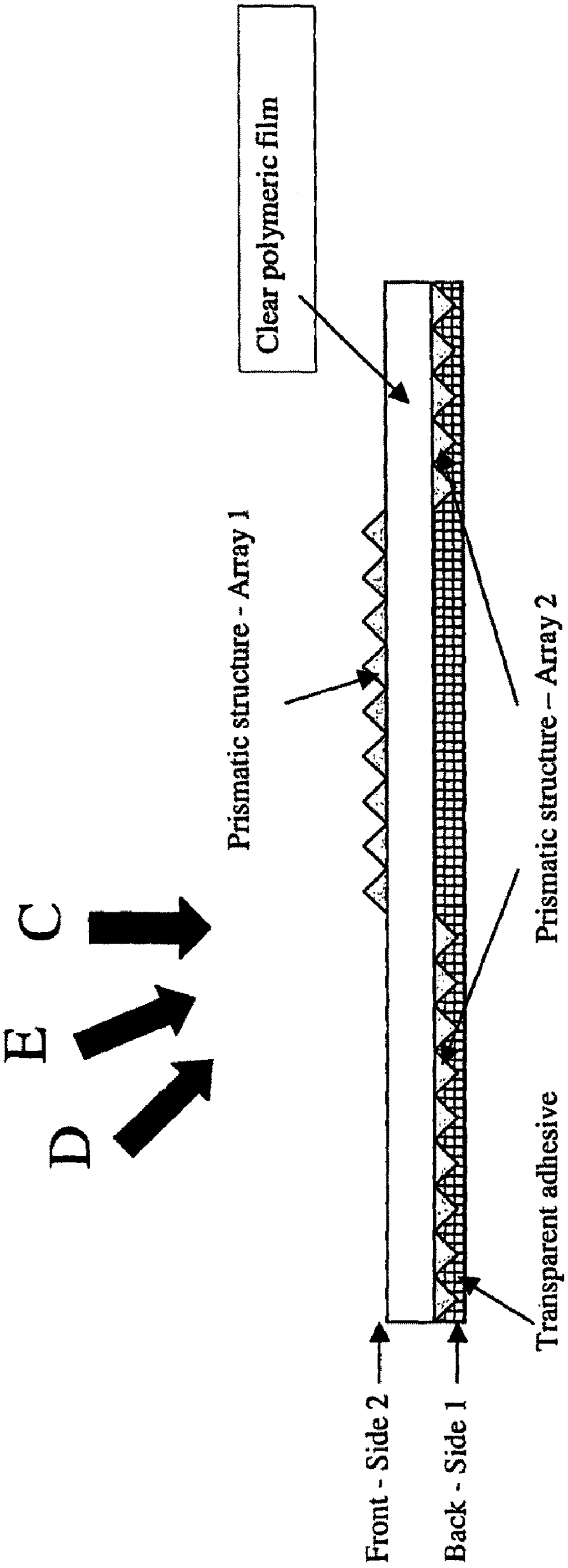
Figure 20:
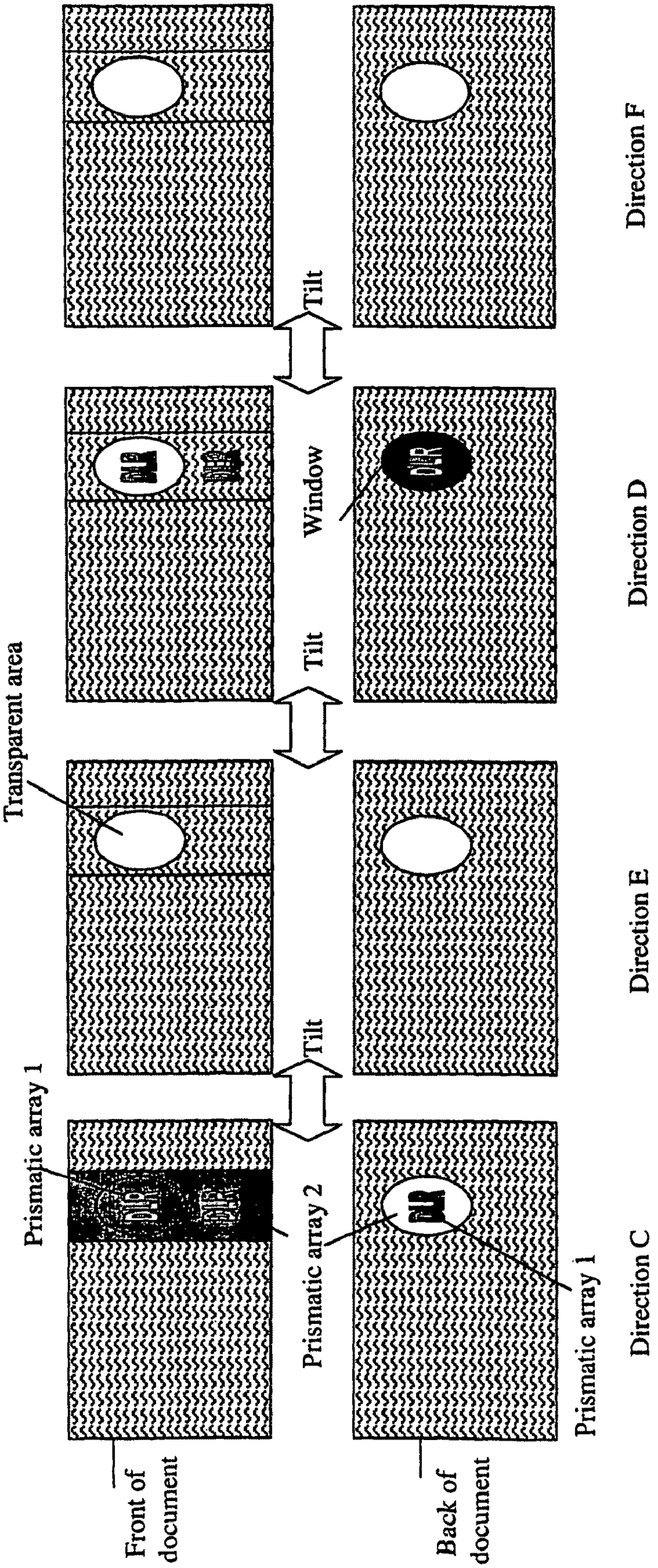
Figure 21:
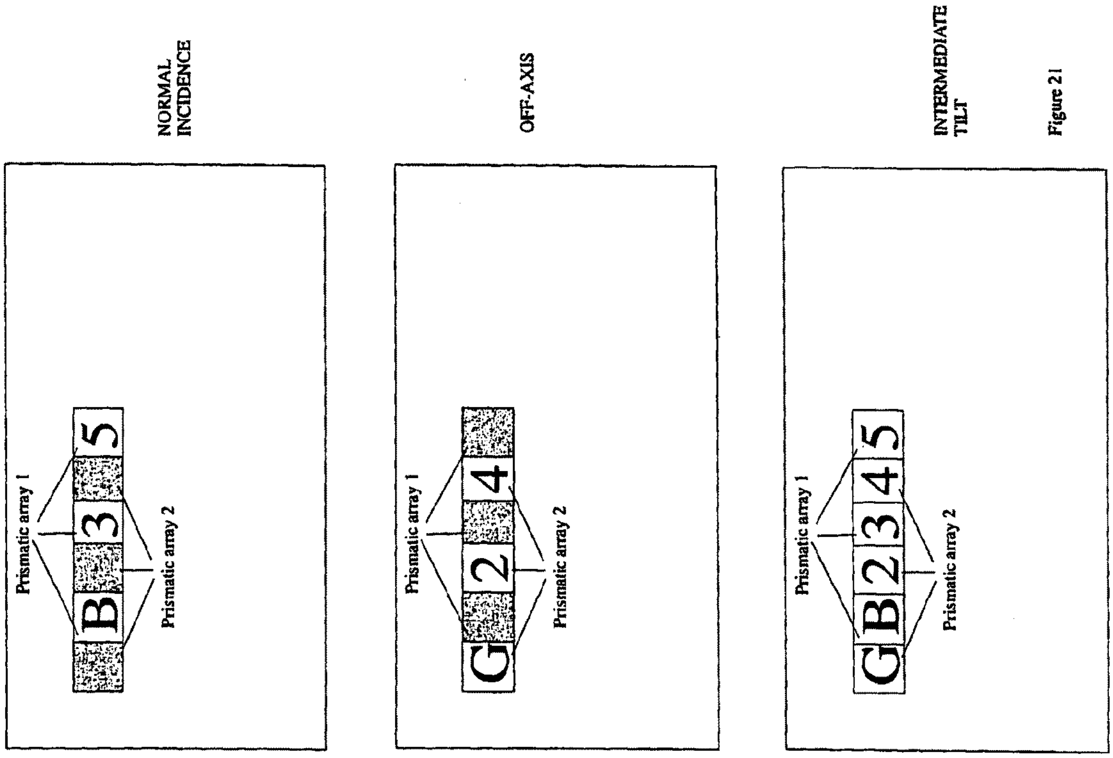
Figure 22:
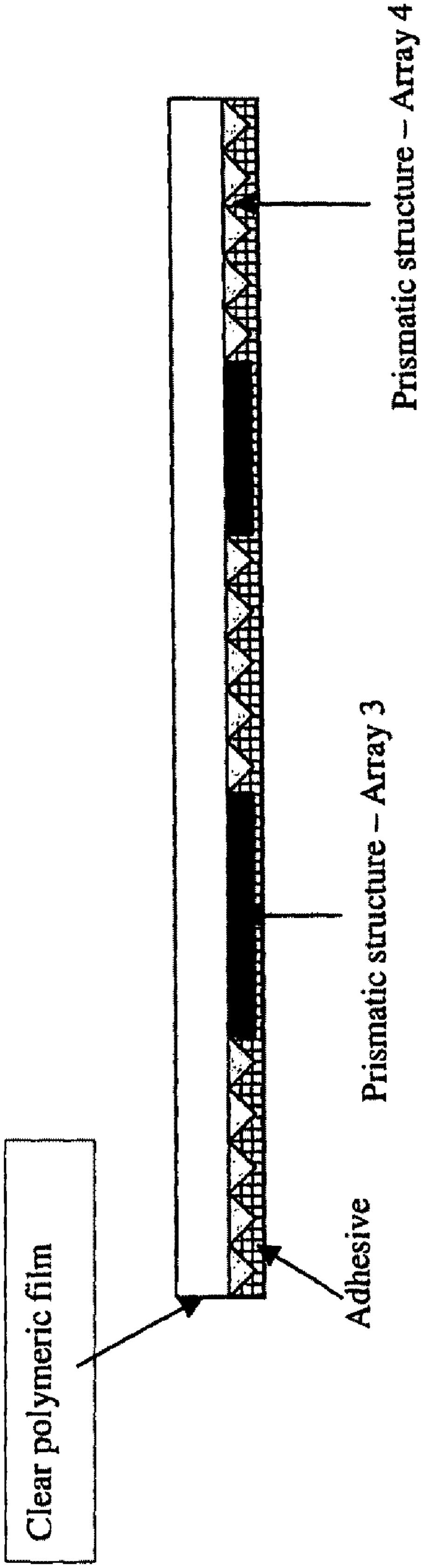
Figure 23:
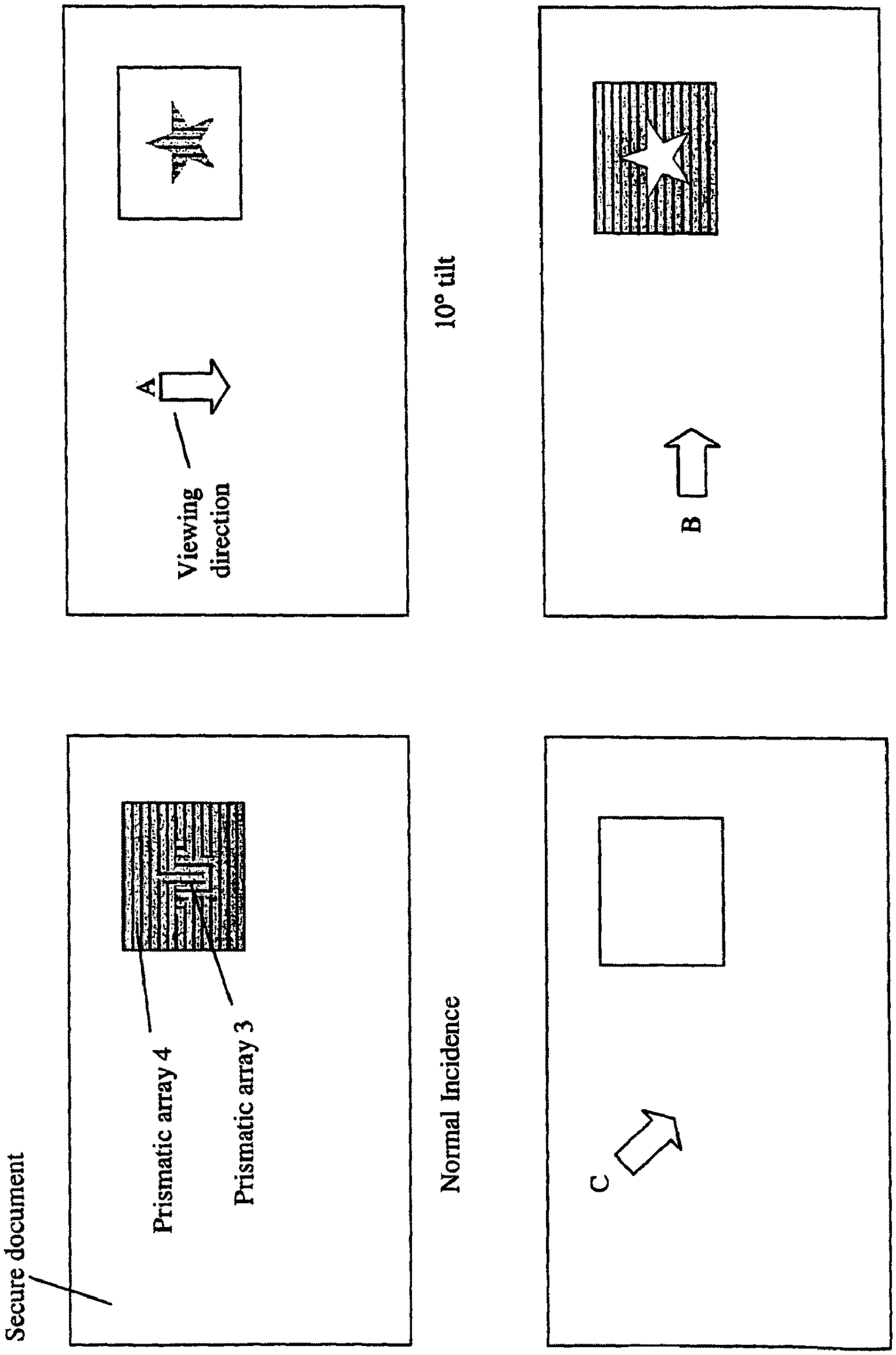
Figure 24:
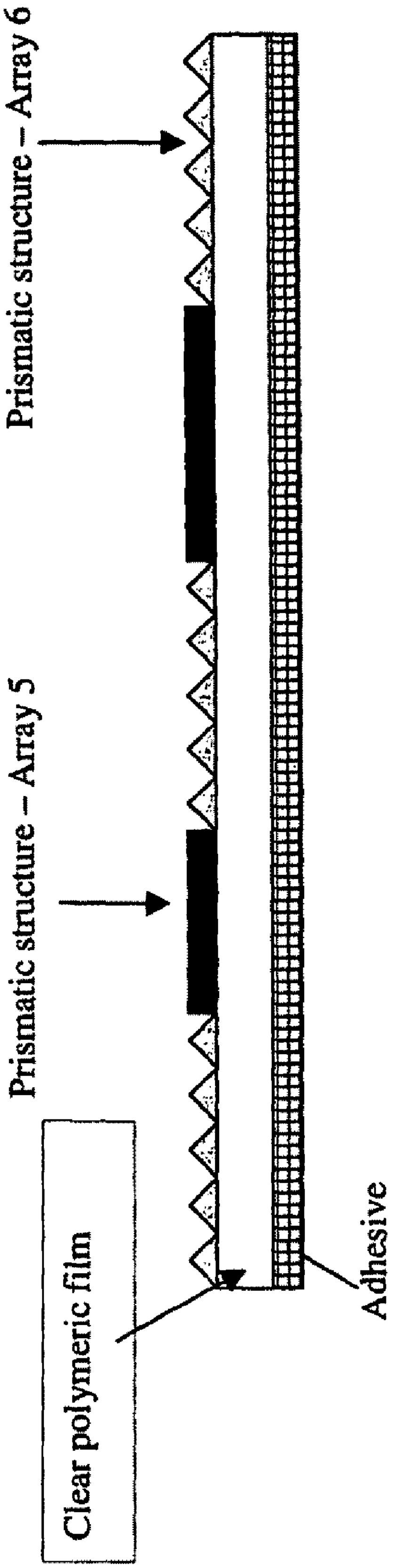
Figure 25:
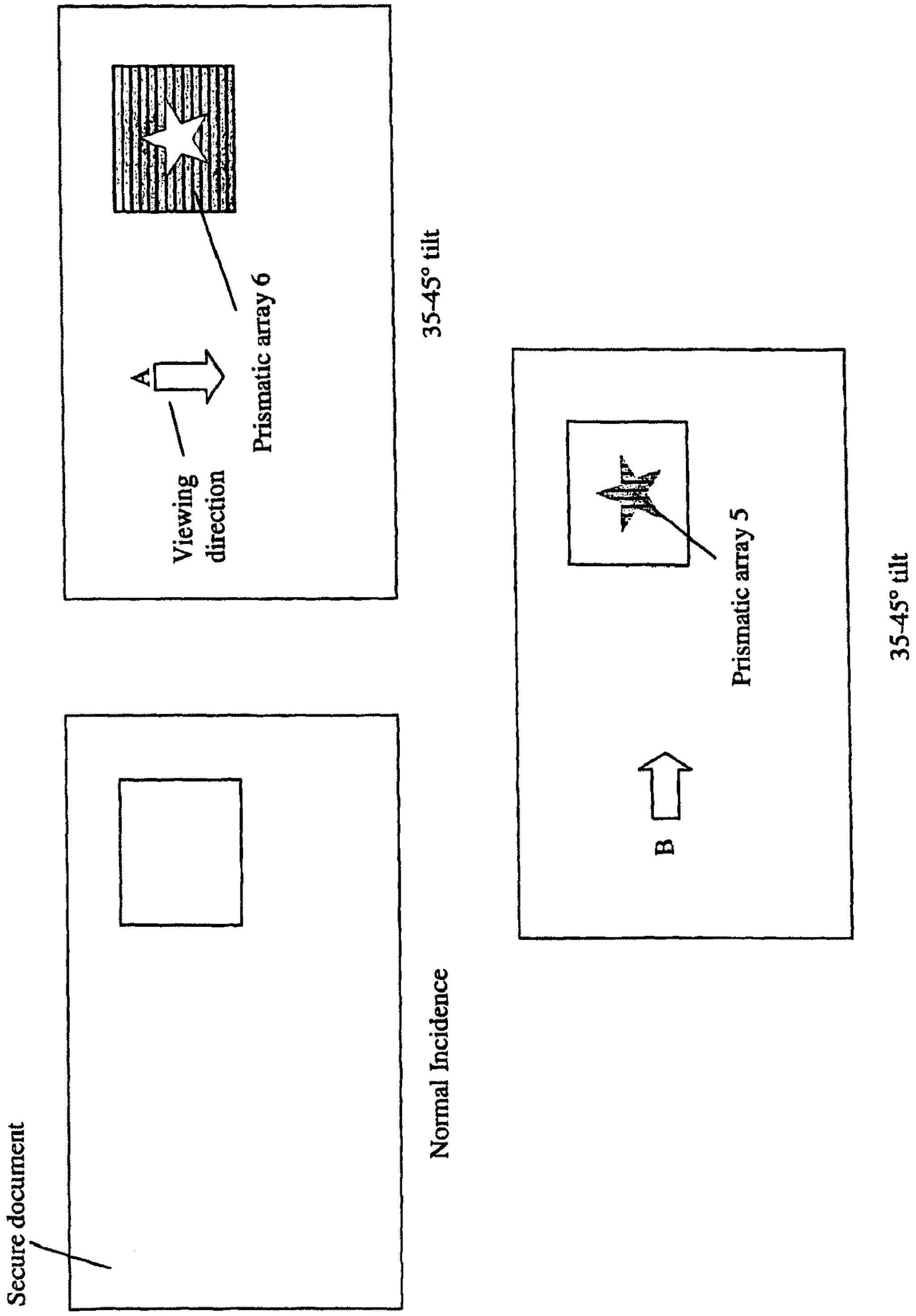
Figure 26:
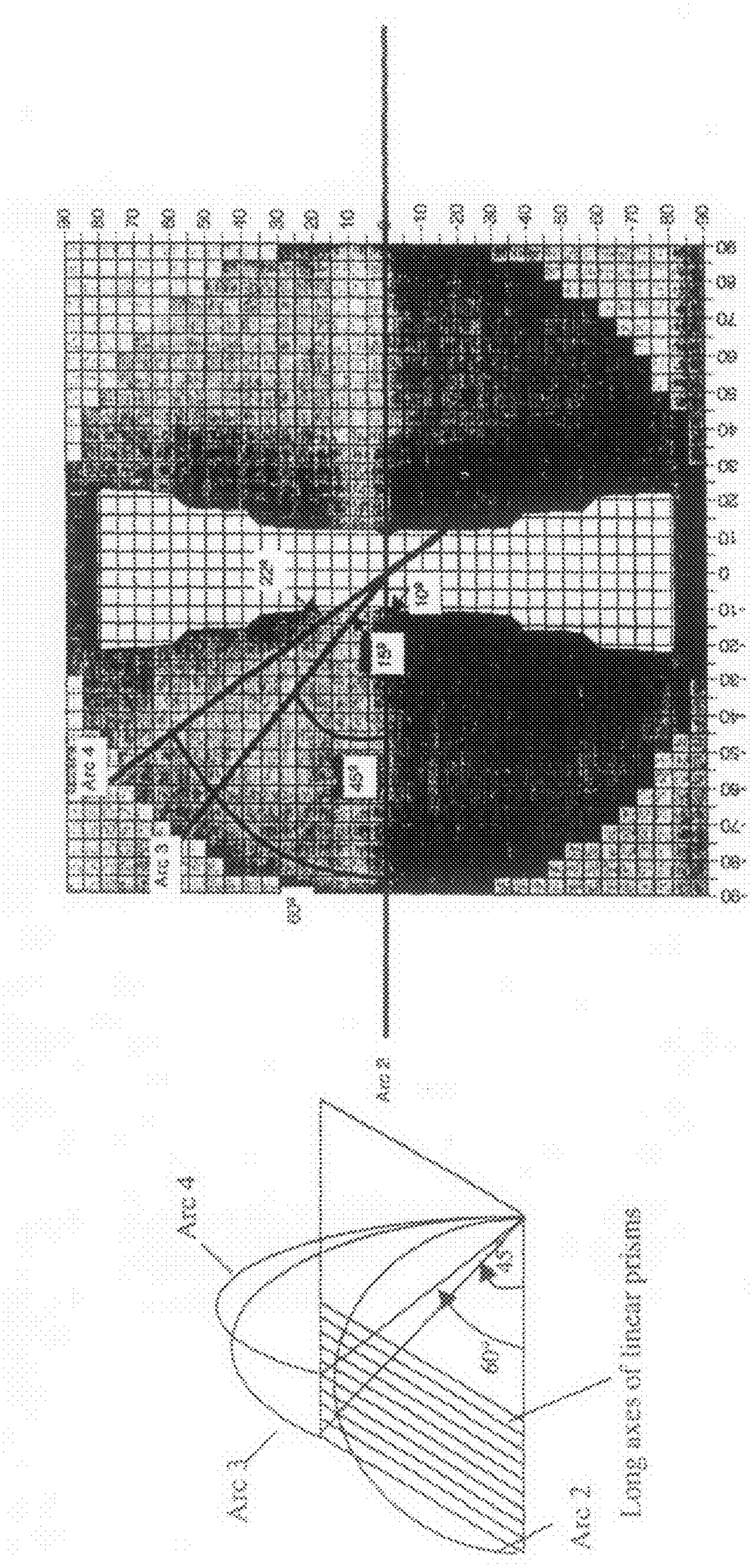
Figure 27:
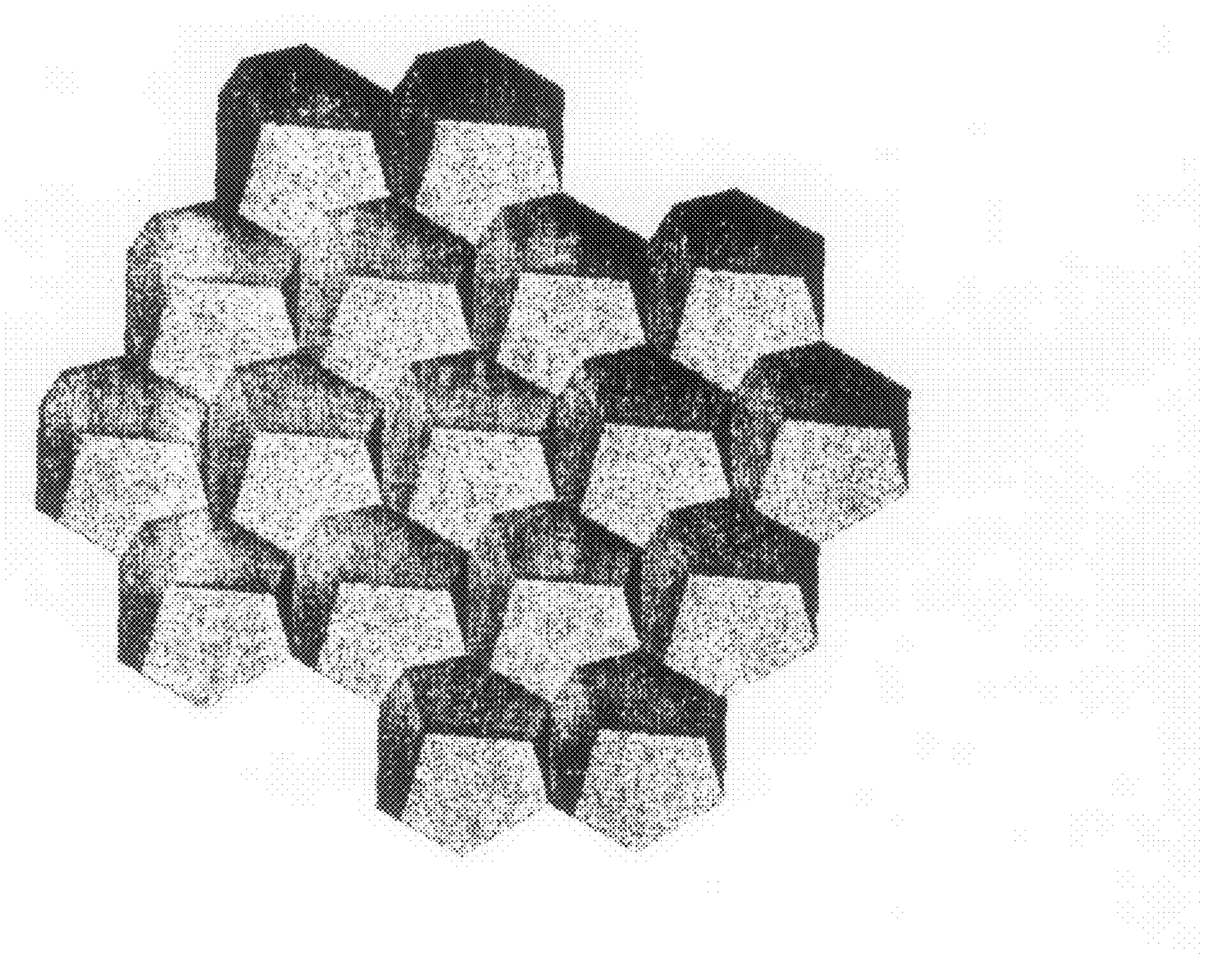
Figure 28:
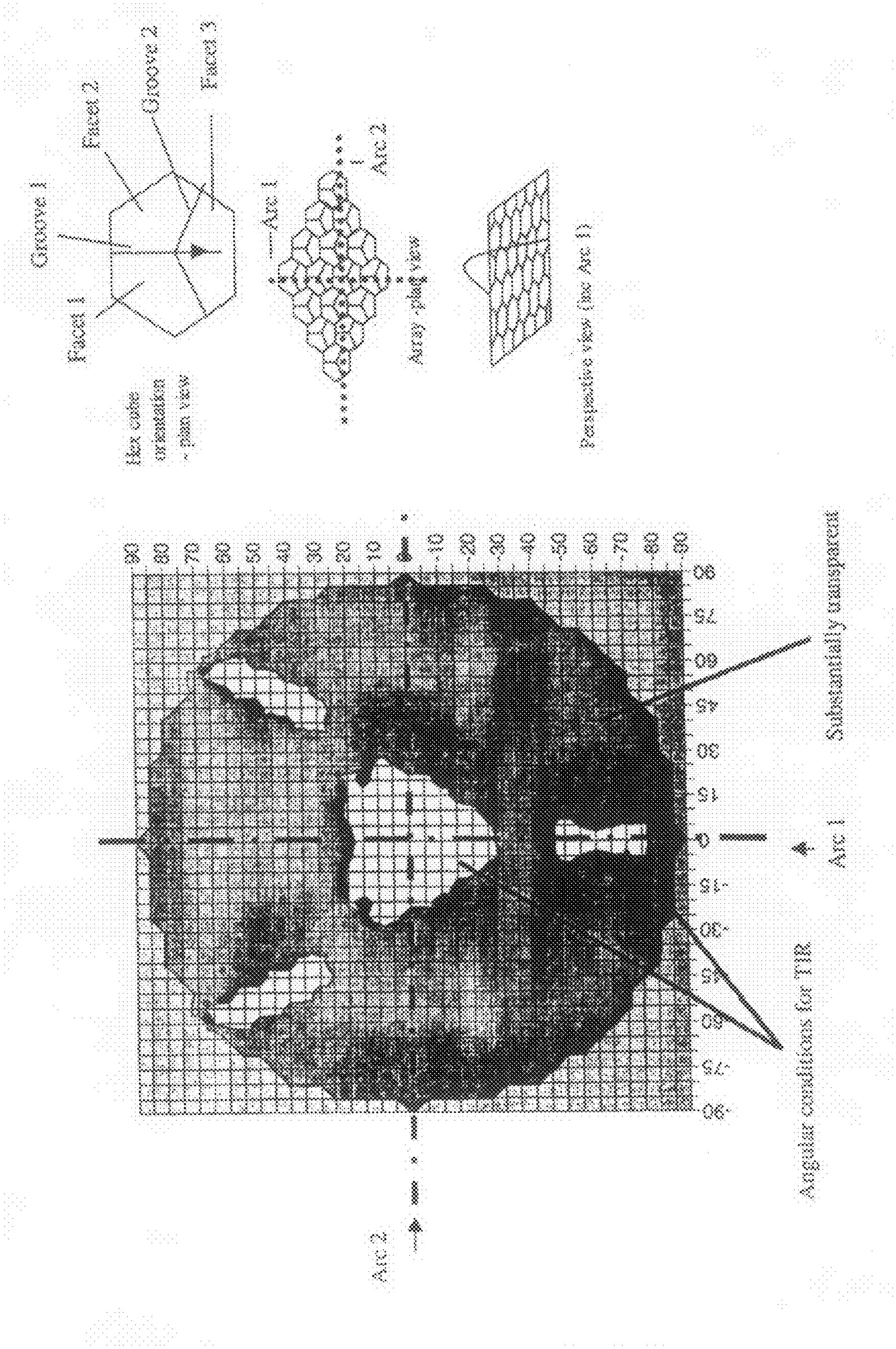
Figure 29:
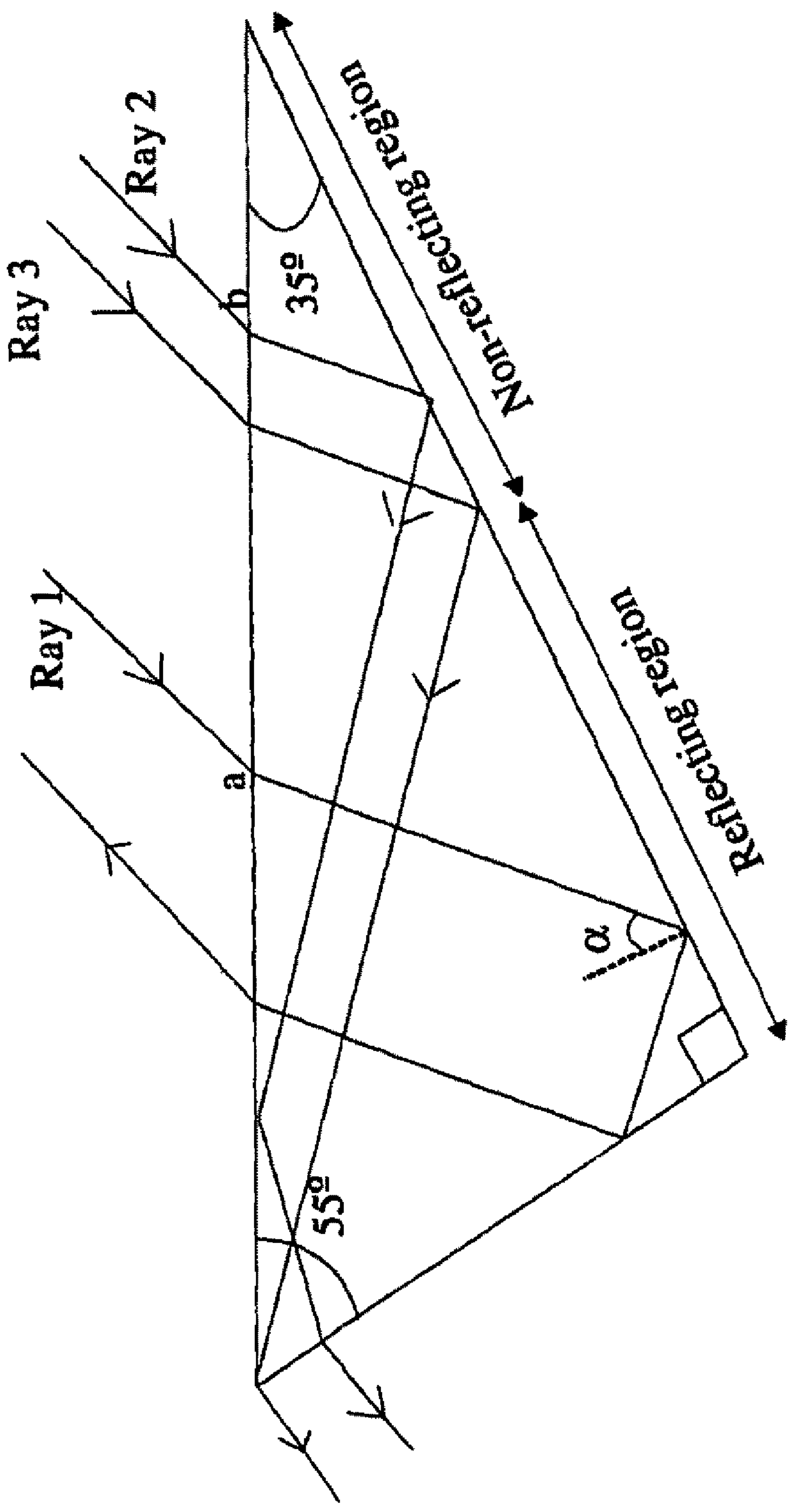
Figure 30:
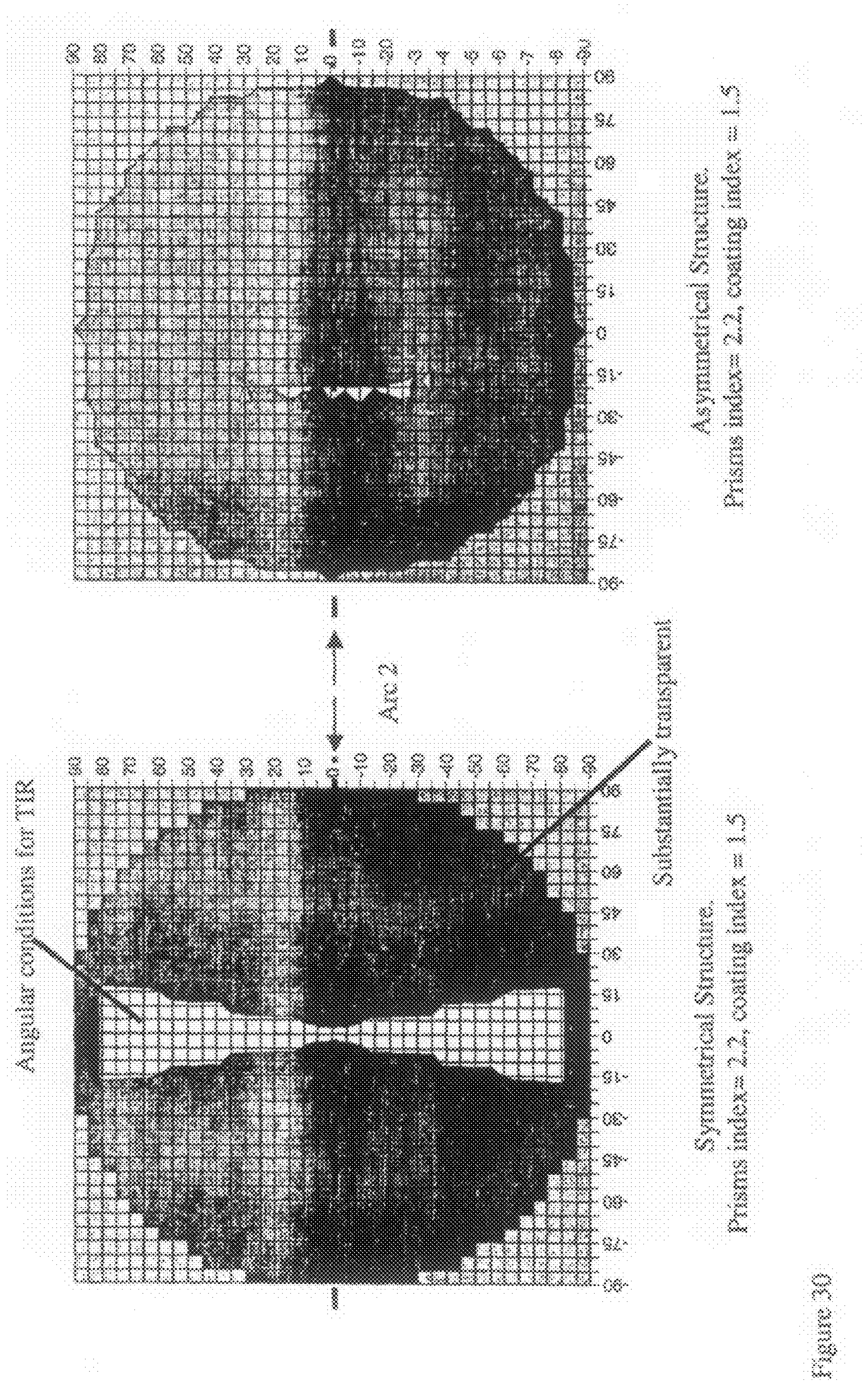
Figure 31:
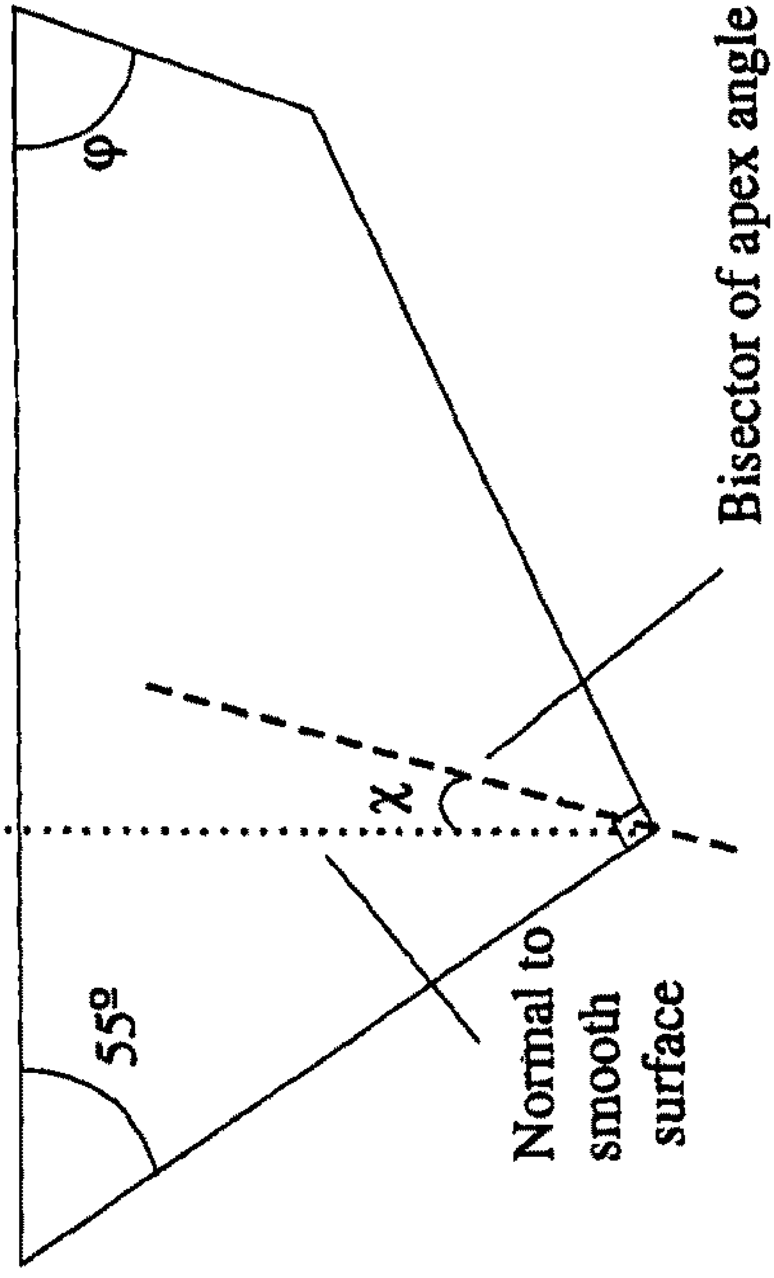
Figure 32:
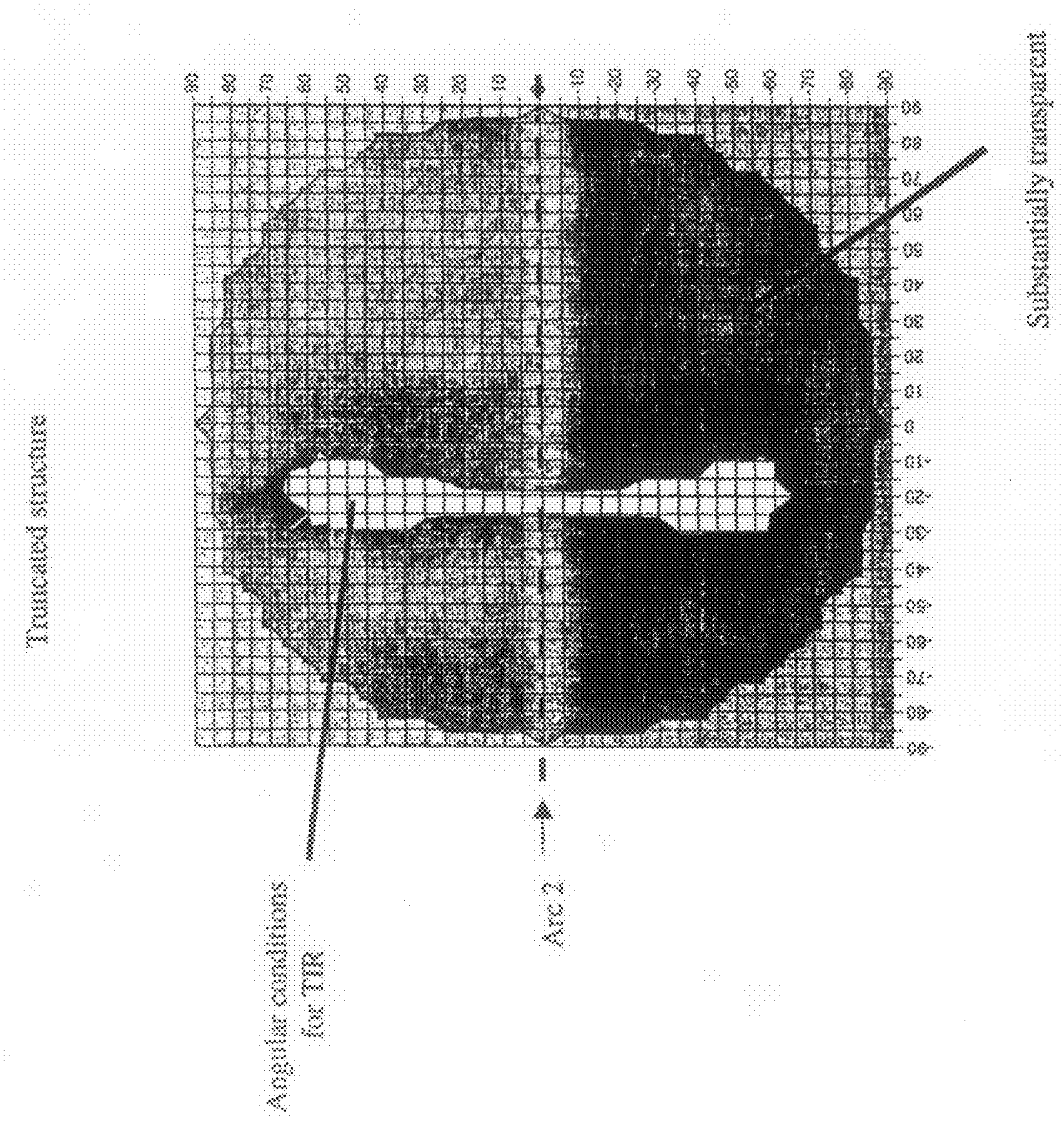
Figure 33:
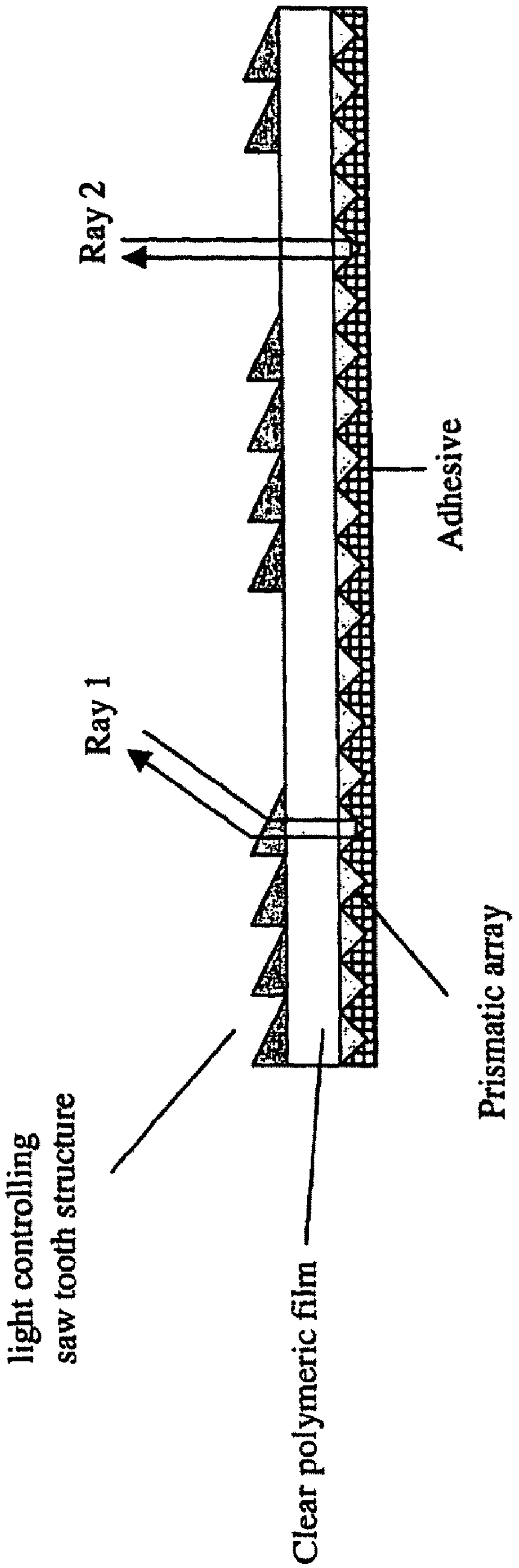
Figure 34:
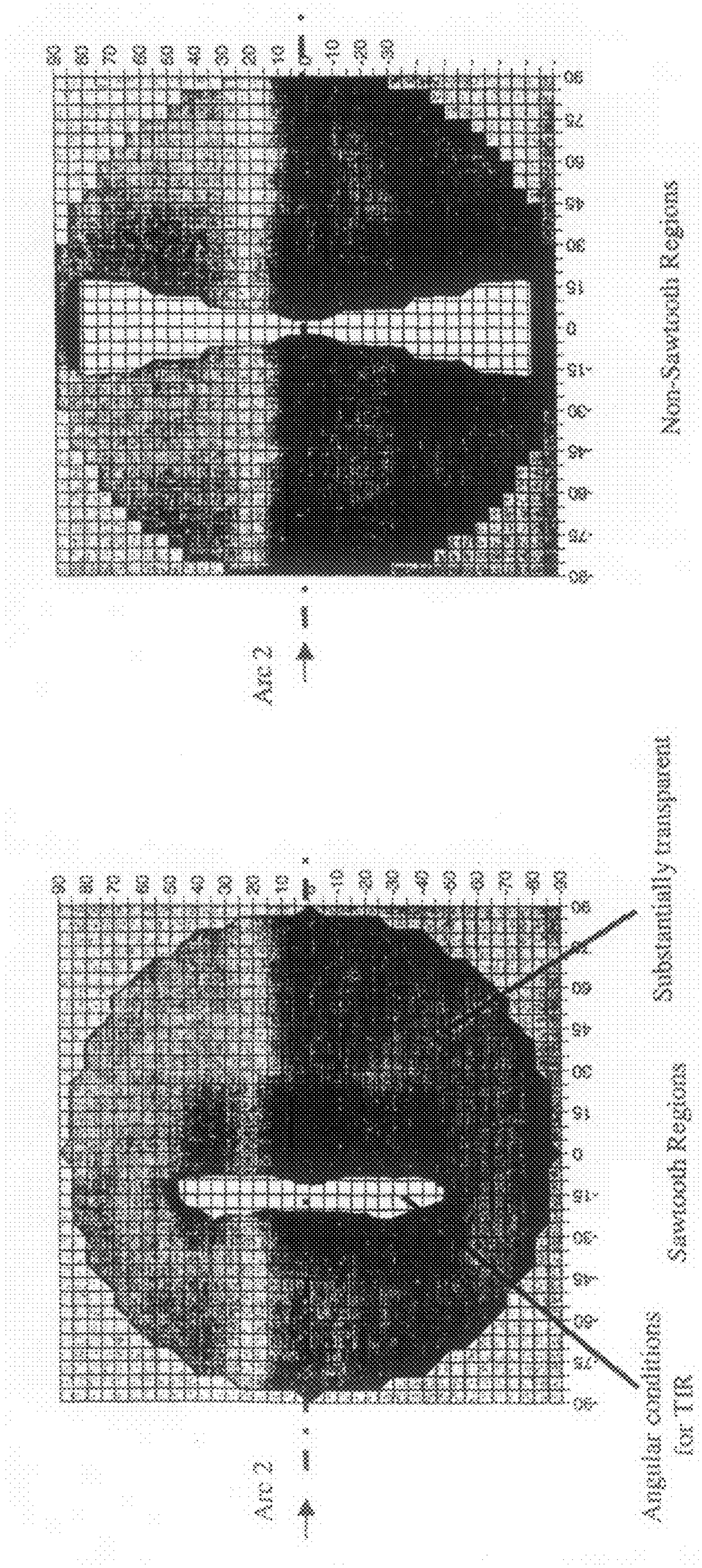
Figure 35:
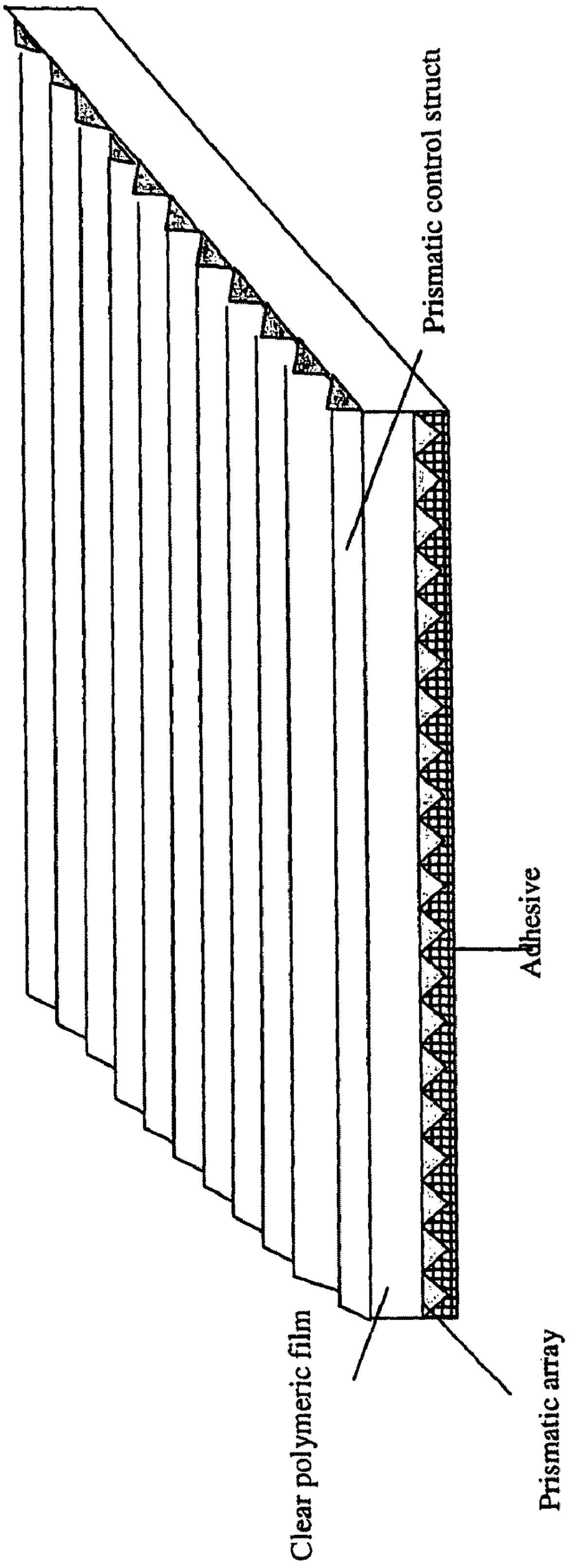
Figure 36:
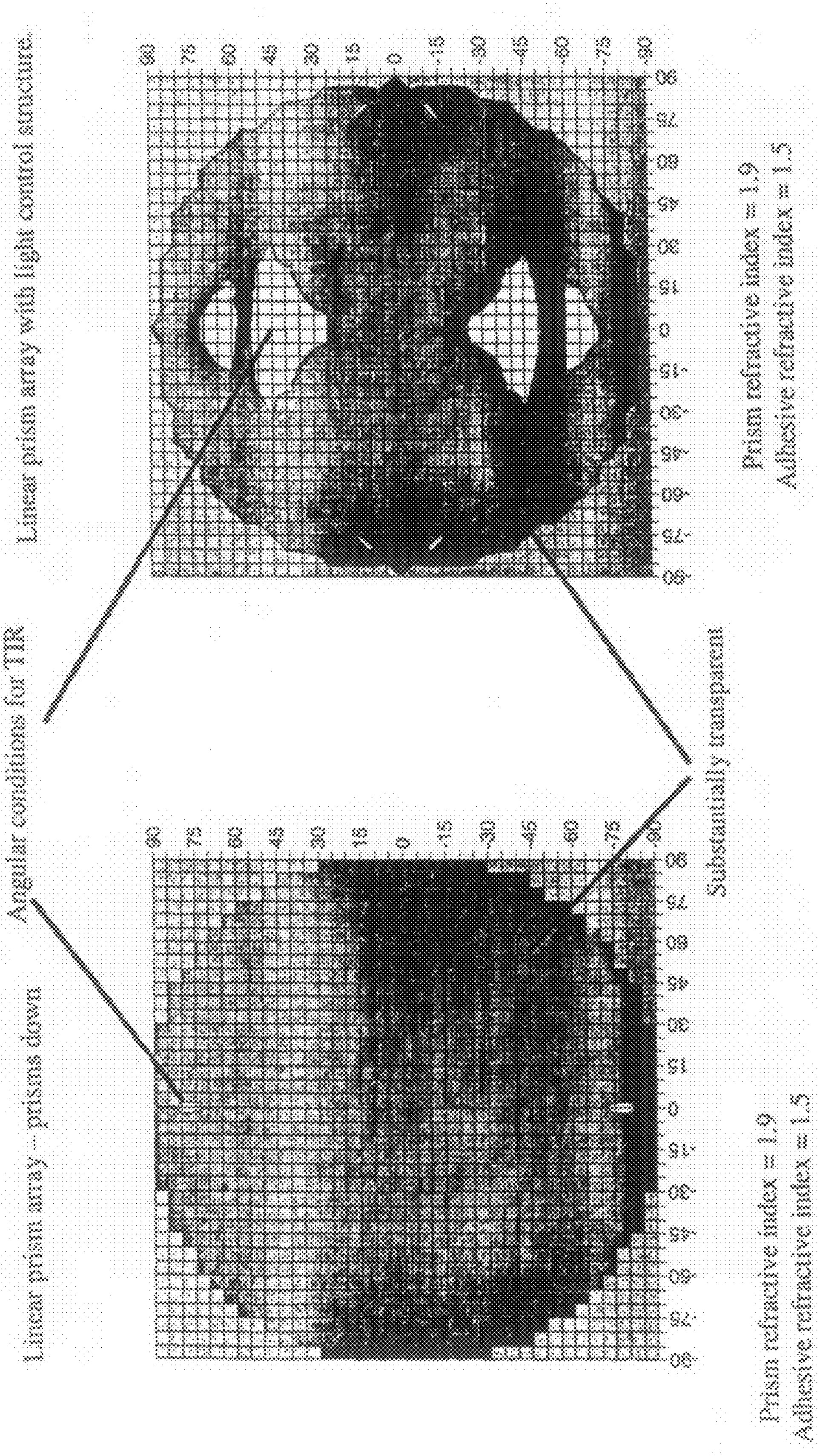
Figure 37:
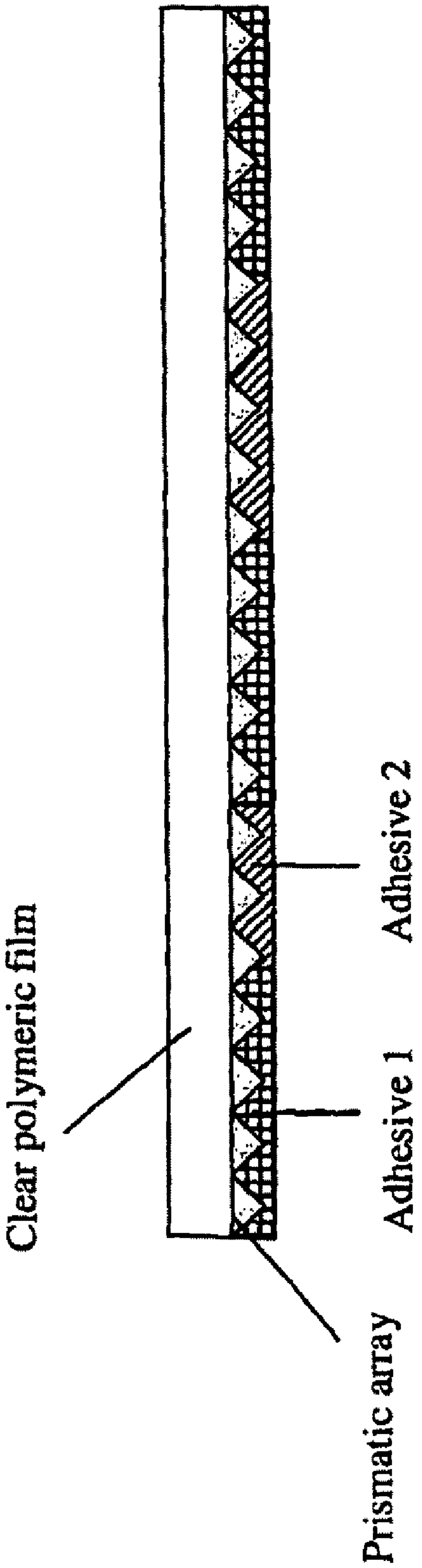
Figure 38:
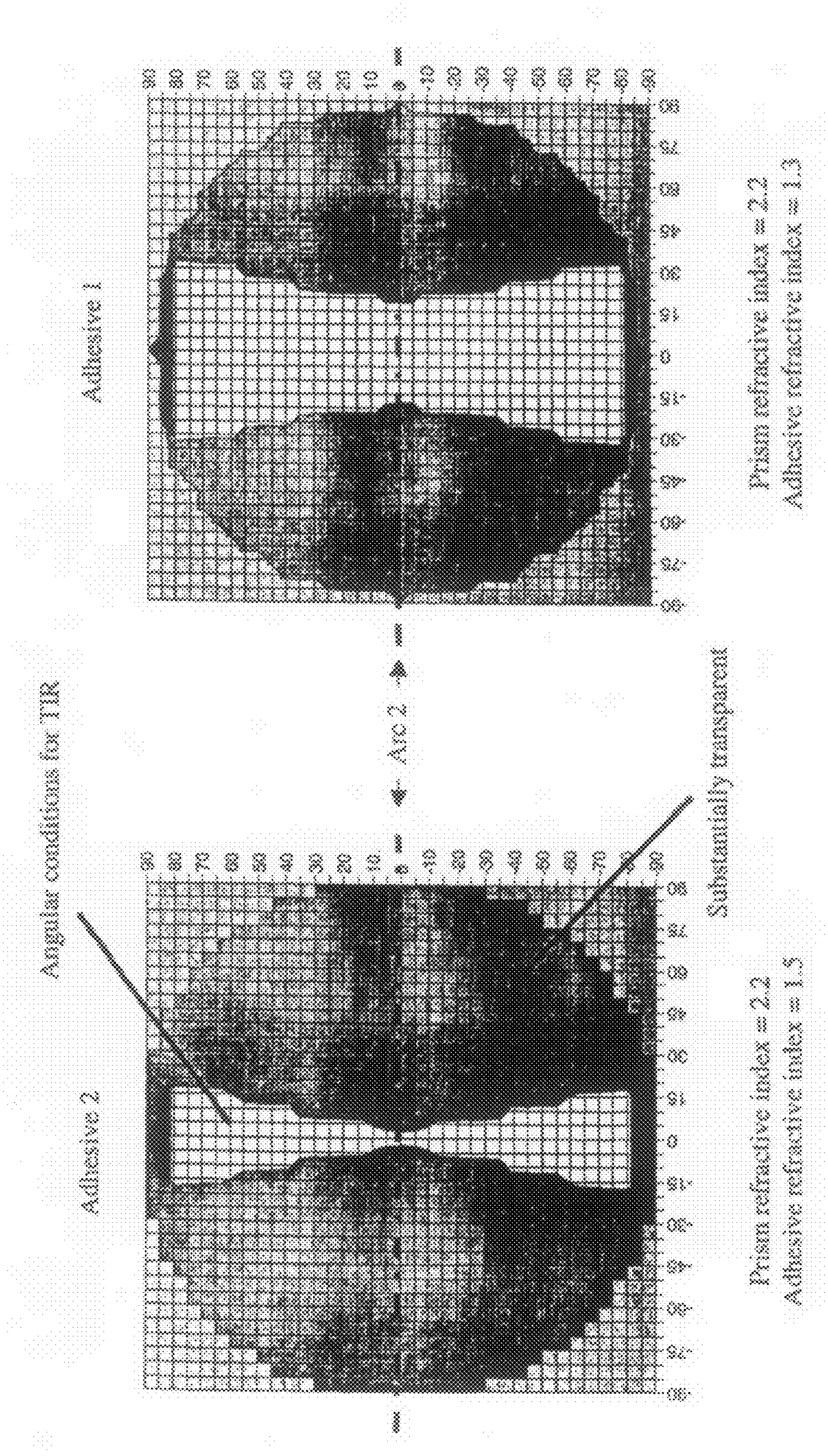
Figure 39:
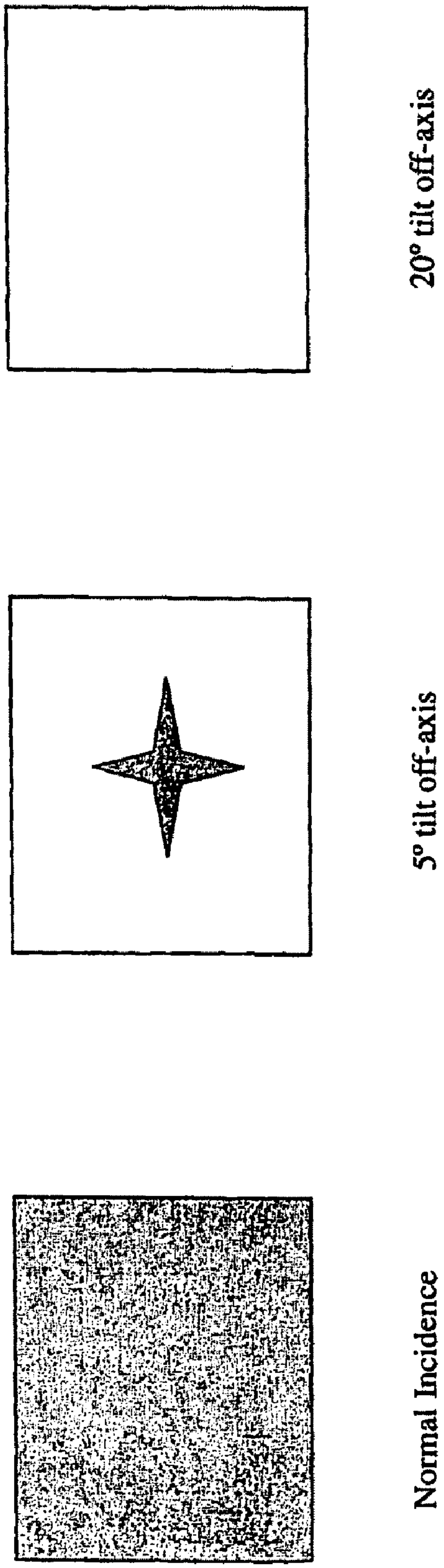

FIG. 19 shows yet a further example in cross-section of a security thread suitable for viewing from either side of a document;

FIG. 20 illustrates the switching sequence obtained with the FIG. 19 example;

FIG. 21 illustrates the switching sequence obtained from the device with a combined transparent to "metallic" switch effect and a printed image on a security document;

FIG. 22 illustrates in cross-section a further example of a security device according to the invention;

FIG. 23 illustrates a secure document containing a device of the type shown in FIG. 22;

FIG. 24 illustrates another example of a device according to the invention, in cross-section;

FIG. 25 illustrates an example of the optical variable effect that can be generated from the security device shown in FIG. 24;

FIG. 26 is a polar plot showing the angular dependence of TIR on rotation for an array of linear prisms in the prisms-down configuration;

FIG. 27 illustrates an example of an array hexagonal-faced corner cubes;

FIG. 28 is a polar plot showing the angular range in which the TIR occurs for the arrangement shown in FIG. 27;

FIG. 29 illustrates an asymmetrical linear prismatic structure;

FIG. 30 illustrates polar plots for a non-truncated structure;

FIG. 31 illustrates a truncated asymmetrical structure;

FIG. 32 is a polar plot relating to the structure shown in FIG. 31;

FIG. 33 is a first example in cross-section of a device having a uniform prismatic structure and an additional light control structure;

FIG. 34 illustrates polar plots for the structure shown in FIG. 33;

FIG. 35 shows a further example of a prismatic light control structure;

FIG. 36 illustrates polar plots comparing the angular range in which TIR occurs for a parallel array of linear prisms in the prisms-down configuration with and without the superimposed prismatic light control structure;

FIG. 37 illustrates in cross-section an example of a device in which a locally varying refractive index is used to define the different regions;

FIG. 38 illustrates polar plots for the device shown in FIG. 37; and,

FIG. 39 shows an example switching sequence for the FIG. 37 example.

Examples of prismatic structures for the current invention include both one-dimensional and two-dimensional prismatic structures. A one-dimensional structure is defined as a structure with a constant cross-section and where the surface height of the structure only varies in one direction. An example of a one-dimensional prismatic structure is a series of parallel linear prisms with planar facets arranged to form a grooved surface. A two-dimensional structure is defined as one where the surface height varies in two directions and the cross-section is not constant. Examples of two-dimensional prismatic structures include but are not limited to a ruled array of tetrahedra, an array of square-based pyramids, an array of corner-cube structures and an array of hexagonal-faced corner-cube structures. As indicated previously the above structures will be substantially reflective via TIR if the prism material has a higher refractive index than the neighbouring material contacting either the facets (prisms-down) or the smooth surface (prisms-up) and the angle of incidence upon the facets or the smooth surface exceeds the critical angle. The refractive index difference between the prismatic materials and the neighbouring material is preferably greater than 0.4 and more preferably greater than 0.6. The higher the refractive index difference the more efficient is the reflection efficiency and the greater is the angular range over which total internal reflection occurs.

Figure 3:
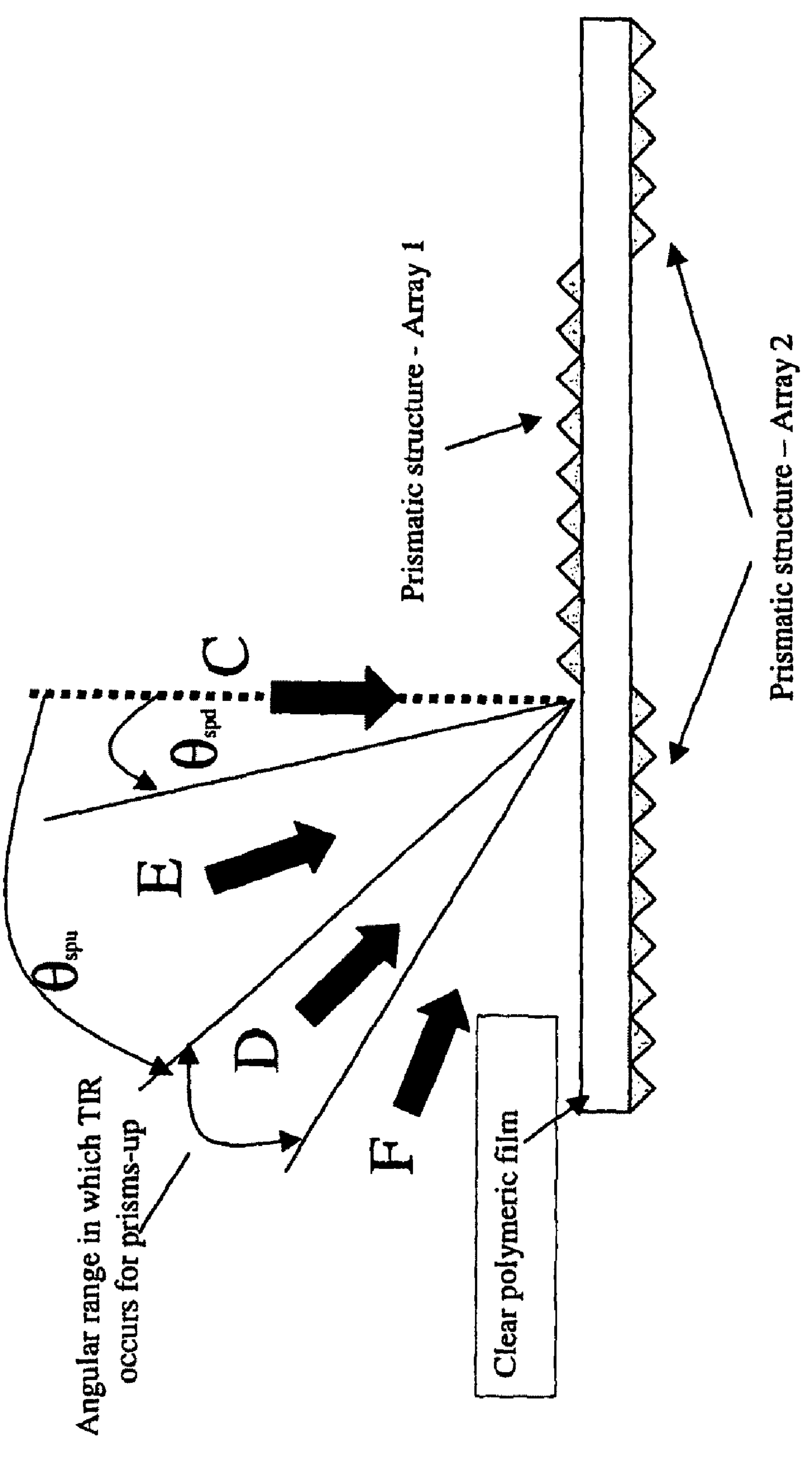
FIG. 3 illustrates a cross-section of a substrate typical of the first aspect for use in security or authenticating devices.

Referring now to FIG. 3 there is illustrated a cross-section of a substrate typical of the construction of the first aspect of the current invention for use in security or authenticating devices. The construction comprises a substantially clear polymeric film of polyethylene terephthalate (PET) or the like. A localised prismatic surface structure, comprising an array of substantially planar facets, is formed on both surfaces of the clear polymeric film. When viewed from the top of the device prismatic array 1 is in the prisms-up configuration and prismatic array 2 is in the prisms-down configuration.

Figure 4:
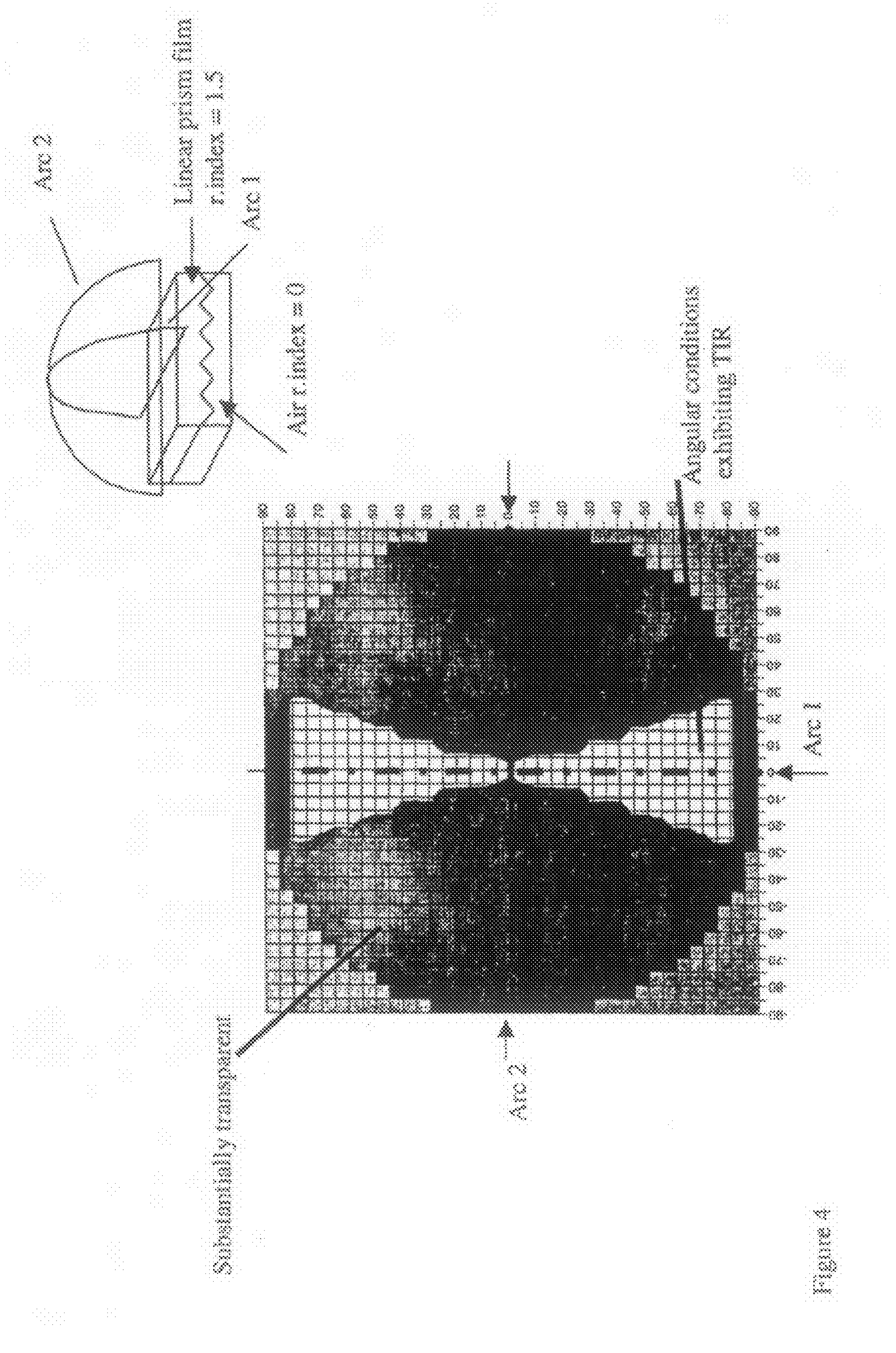
FIG. 4 is a polar plot showing the reflectivity of a typical linear prism film.

An array of parallel linear prisms is the preferred prismatic structure for the current invention because it has very high reflection efficiency and therefore will appear strongly "metallic" within the angular range where the conditions for TIR are satisfied. The prism pitch is preferably in the range 1-100 μm and more preferably in the range 5-40 μm and where the facets makes an angle of approximately 45° with the base substrate and the angle between the facets is approximately 90°. For a device containing an array of parallel linear prisms the viewing angle at which TIR occurs will depend on the angle of rotation of the substrate in its plane. FIG. 4 is a polar plot showing the reflectivity of a typical linear prism film where the angle of rotation of the substrate in its plane is represented circumferentially and the angle of incidence light is represented radially (90° to −90°). The centre of the plot corresponds to light entering the film at normal incidence. For the example shown, the refractive index of the prism film is 1.5 and the prisms are in contact with air, which has a refractive index of ~1. In this example the prism pitch is 20 μm and the prism height is 10 μm. The prismatic film is oriented such that the apexes of the prism are pointing away from the viewer (i.e. prisms-down configuration). If the radius is defined as the distance of a point from the centre of the plot, then each radius corresponds to the degree of tilt away from normal incidence. The rotation angle is the angle between the direction of tilt and the long axes of the linear prisms. For example in FIG. 4, arc 1 illustrates the condition where the direction of tilt is parallel to the long axes of the linear prisms and arc 2 illustrates the condition where the direction of tilt is perpendicular to the long axes of the linear prisms. The horizontal scale on the plot represents the angles of incidence along arc 2 and the vertical scale represents the angles of incidence along arc 1. For simplicity the scales representing the angles of incidence for the other rotational orientations are not shown. In the polar plot the values at each point correspond to reflectivity where reflectivity has a value between 0 and 1 where 0 is equivalent to 0% reflectivity and 1 is equivalent to 100% "metallic" reflectivity. For the current invention, the film will be totally reflecting and exhibit a "metallic" appearance if the reflectivity is greater than 0.7 and preferably greater than 0.8 and more preferably greater than 0.9. In order to simplify the plot, the light shaded area on the diagram indicates the angular conditions at which the reflectivity is greater then 0.8 and therefore illustrates the approximate angular range exhibiting TIR. The dark shaded area in FIG. 4 indicates the angular range in which the film is substantially transparent i.e. areas with a reflectivity of less than 0.4, however it should be noted that there is a small transitional area between the totally reflecting and substantially transparent states not shown in FIG. 4 or any of the subsequent polar plots. The size of this transitional area is normally such that in practice the viewer will observe a sharp switch from the totally reflecting to the substantially transparent state. FIG. 4 shows that when the direction of tilt is parallel to the long axes of the linear prisms (i.e. arc 1) TIR occurs at all angles of incidence, however when the direction of tilt is perpendicular to the long axes of the linear prisms TIR occurs at normal incidence and angles of incidence up to approximately 5° away from the normal. As the angle between the direction of tilt and the long axes of the linear prism changes from perpendicular to parallel the angular range at which TIR occurs increases i.e. the film remains totally reflecting at increasingly oblique angles.

Figure 5:
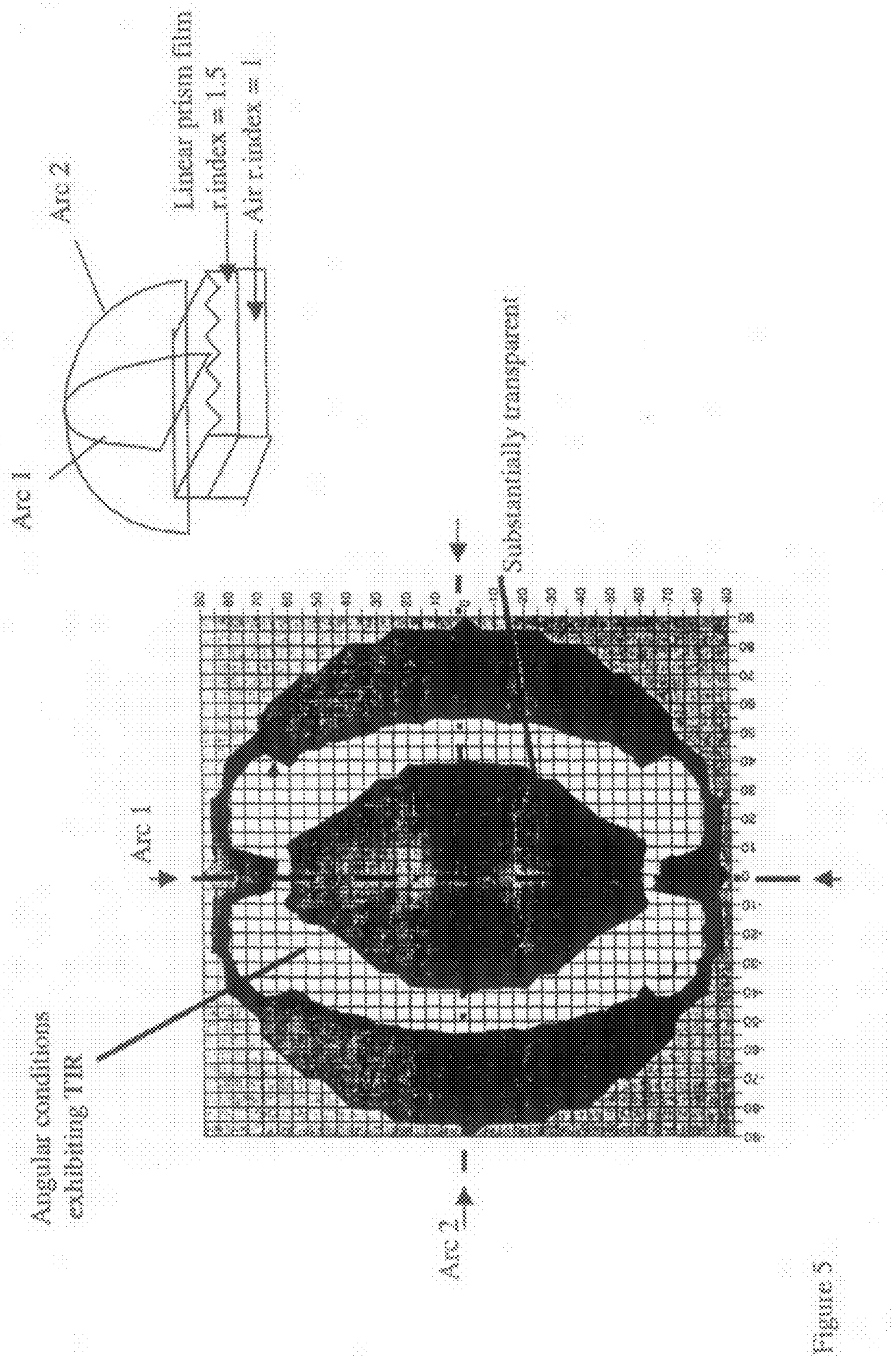
FIG. 5 is a view similar to FIG. 4 but for an alternative orientation of prisms.

FIG. 5 shows an equivalent polar plot to FIG. 4, using the same prismatic structure and refractive indices, for the prisms-up orientation. FIG. 5 shows that when the direction of tilt is perpendicular to the long axes of the linear prisms (arc 2) TIR reflection occurs for angles of incidence between approximately 40-55° and outside this range the film is substantially transparent. However when the direction of tilt is parallel to the long axes of the linear prisms TIR occurs at a significantly more oblique angle of incidence approximately in the range 60-65°.

FIGS. 4 and 5 illustrate that when the direction of tilt is perpendicular to the long axes of the linear prisms, or in a range up to ~45° away from the perpendicular, the tilt angle $\theta_{spd}$ at which the prisms-down configuration switches from "metallic" to transparent is significantly closer to normal incidence than the tilt angle $\theta_{spu}$ at which the prisms-up configuration switches from transparent to "metallic". Therefore at intermediate tilting angles between $\theta_{spd}$ and $\theta_{spu}$ both the prisms-up and the prisms-down configurations will be transparent. In addition, for the same range of tilt directions, the prisms-up configuration only exhibits TIR in a certain angular range, for example ~40-64° for the system in FIG. 5, depending on the exact tilt direction. For angles of incidence that exceed this range both the prisms-up and the prisms-down configurations will be substantially transparent.

The fact that the reflective properties of an array of linear prisms is not symmetrical can be used to form customised devices as detailed in the second aspect of the invention. However for the first aspect of the invention the customisation is arising from the different reflective properties in the prism-up and prisms-down configuration and the device is preferably orientated such that the optical switch occurs at the preferred viewing position of the authenticator. For example on a secure document such as a banknote the device could be oriented such that the long axes of the prisms are parallel to the long axes of the banknote such that the optical switch from totally reflecting to transparent is easily observed by tilting around the long axis of the banknote.

Two-dimensional prismatic structures such as square pyramids, cornercubes and hexagonal-faced corner cubes are less sensitive to the rotation of the substrate, but such structures are not as efficient reflectors as an array of parallel linear prisms with TIR failing at some locations on the facets. However the switch from the reflective to the transparent state as the angle of view is changed is still distinct enough to enable two-dimensional prismatic structures to be used in the optically variable device of the first aspect of the current invention. The facets of the two-dimensional prismatic structures are typically in the region of 1-100 μm across and more preferably in the region of 5-40 μm. For the square pyramids the facets are typically disposed at an angle of ~45° to the base substrate and the angle between the facets is approximately 90°. For the corner-cubes and the hexagonal-faced corner-cubes the facets are typically disposed at an angle of ~55° to the base substrate and the angle between the facets is approximately 90°. One advantage of the corner-cube and hexagonal-faced corner-cube structures over an array of parallel linear prisms is that a lower refractive index difference between the prismatic material and the neighbouring material is required to exhibit TIR. For example a device comprising an array of corner-cube structures with a refractive index difference of 0.4 would exhibit total internal reflection over a greater range of viewing angles than a device comprising an array of parallel linear prisms with a refractive index difference of 0.4. The optical security device of the first aspect of the current invention can also be achieved using asymmetrical prismatic structures, examples of which are described in U.S. Pat. No. 3,817,596, WO04061489 and EP0269329.

Films comprising a surface prismatic structure can be produced by a number of industry standard methods including UV casting, micro-embossing and extrusion. The preferred methods for the prismatic films used in the current invention are UV casting and micro-embossing.

The first stage of the UV casting process is the formation of a master structure in the form of a production tool. A negative version of the final prismatic structure is created in the production tool using well known techniques such as diamond turning, engraving, greyscale photolithography and electroforming. The production tool can typically be in the form of a sheet, a cylinder or a sleeve mounted on a cylinder. A preferred method for the production tool is diamond turning. In this process a very sharp diamond tool is used to machine a negative version of the required prismatic structure in a metallic material such as copper, aluminium and nickel.

In a typical UV casting process a flexible polymeric film is unwound from a reel, where a UV curable polymer is then coated onto the substrate film. If required, a drying stage then takes place to remove solvent from the resin. The film is then held in intimate contact with the production tool in the form of an embossing cylinder, whereby the prismatic structure defined on the production tool is replicated in the resin held on the substrate film. UV light is used at the point of contact to cure and harden the resin, and as a final stage, the reel of flexible prismatic film is rewound onto a reel. UV casting of prismatic structures is, for example, described in U.S. Pat. No. 3,689,346.

Flexible polymeric films suitable for the UV casting process include polyethylene teraphthalate (PET), polyethylene, polyamide, polycarbonate, poly(vinylchloride) (PVC), poly (vinylidenechloride) (PVdC), polymethylmethacrylate (PMMA), polyethylene naphthalate (PEN), and polypropylene.

UV curable polymers employing free radical or cationic UV polymerisation are suitable for the UV casting process. Examples of free radical systems include photo-crosslinkable acrylate-methacrylate or aromatic vinyl oligomeric resins. Examples of cationic systems include cycloaliphatic epoxides. Hybrid polymer systems can also be employed combining both free radical and cationic UV polymerization. Further examples of polymer systems suitable for the formation of prismatic films by UV casting are given in U.S. Pat. No. 4,576,850 and U.S. Pat. No. 5,591,527.

An alternative process for the production of films comprising a surface prismatic structure is micro-embossing. Suitable micro-embossing processes are described in U.S. Pat. No. 4,601,861 and U.S. Pat. No. 6,200,399. In U.S. Pat. No. 4,601,861 a method is described for continuously embossing a corner-cube structure in a sheeting of thermoplastic material, where the actual embossing process takes place at a temperature above the glass transition temperature of the sheeting material. Suitable thermoplastic materials include polyethylene teraphthalate (PET), polyethylene, polyamide, polycarbonate, poly(vinylchloride) (PVC), poly(vinylidenechloride) (PVdC), polymethylmethacrylate (PMMA), polyethylene naphthalate (PEN), polystyrene, polysulphone and polypropylene.

Figure 1:
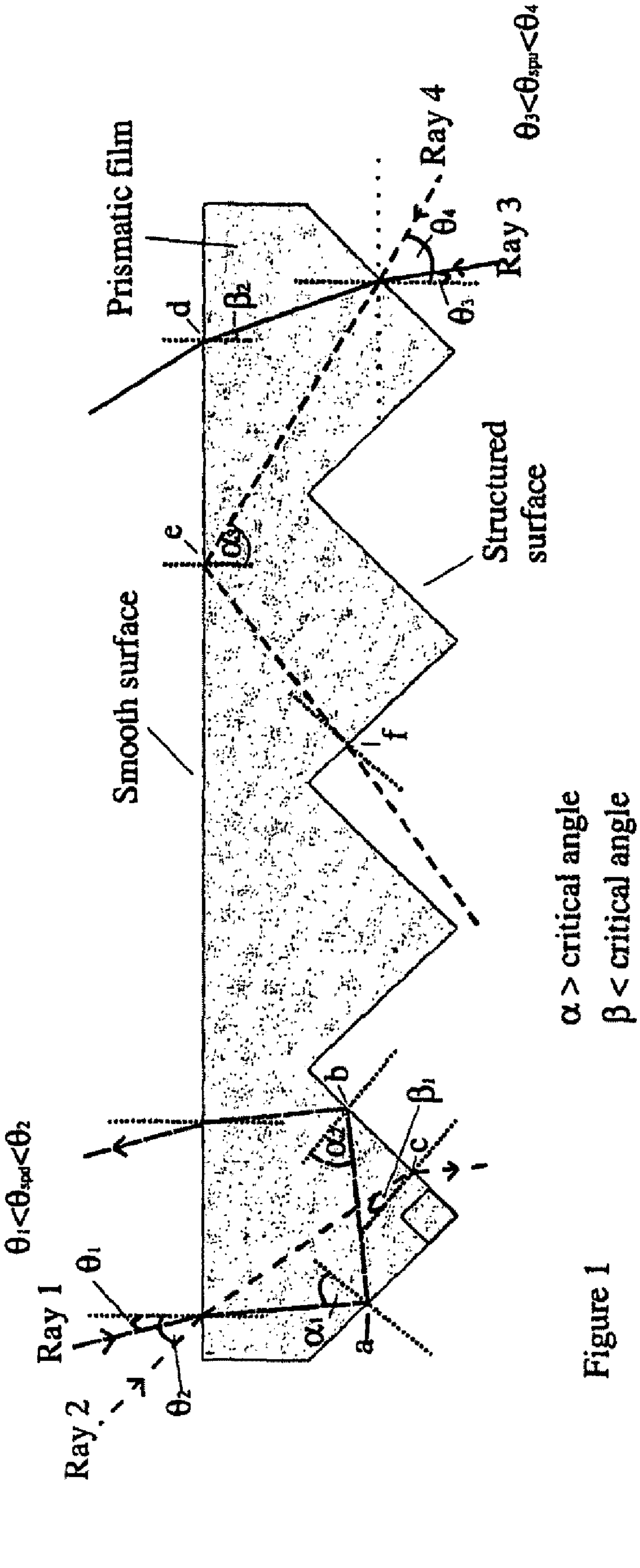
FIG. 1 is a cross-section through a prismatic film.
Figure 2:
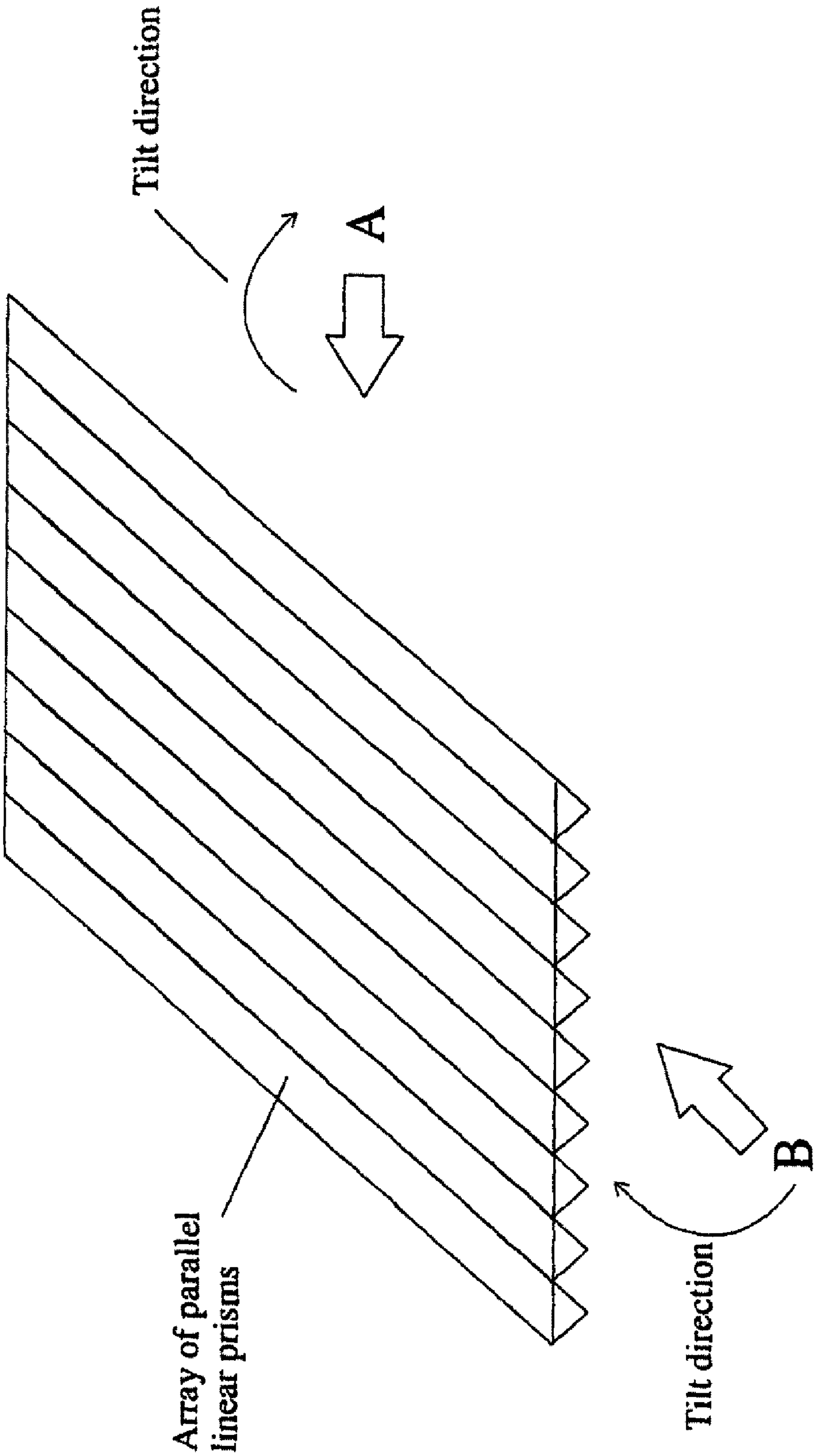
FIG. 2 illustrates a film comprising a linear prism array.

The device construction in FIG. 3 comprises prismatic arrays 1 and 2 formed on opposite surfaces of the clear polymeric film where the prismatic array is an array of linear parallel prisms and the refractive index of the material forming the prismatic array has a higher refractive index than the neighbouring material contacting both the facets and the smooth planar boundary. Prismatic array 1 is in the prisms-up configuration relative to the viewer and the passage of light though the structure is as defined for rays 3 and 4 in FIG. 1 when viewed perpendicularly to the long axes of the linear prisms. A light ray travelling along direction C is incident on prismatic array 1 at an angle less than the switching angle $\theta_{spu}$ and therefore the majority of the light is transmitted via refraction. If the device is now tilted such that the light is travelling along direction D such that the angle of incidence is now greater than the switching angle $\theta_{spu}$ and within the angular range for TIR all of the light is reflected by prismatic array 1. Prismatic array 2 is in the prisms-down configuration relative to the viewer and the passage of light though the structure is as defined for rays 1 and 2 in FIG. 1 when viewed perpendicularly to the long axes of the linear prisms. A light ray travelling along direction C is incident on prismatic array 2 at an angle of incidence that is less than the switching angle $\theta_{spd}$ and all the light is reflected. If the device is now tilted such that the light is travelling along direction D, the angle of incidence on prismatic array 2 is now greater than the switching angle $\theta_{spd}$ and therefore the majority of the light is transmitted via refraction. For a light ray travelling along direction E at an intermediate angle of incidence between directions C and D, such that the tilting angle is greater than $\theta_{spd}$ but less than $\theta_{spu}$, both prismatic arrays 1 and 2 will be substantially transparent. Prismatic arrays 1 and 2 will also both be substantially transparent when the sample is viewed along direction F at an angle of incidence exceeding the angular range in which TIR is exhibited for the prisms-up configuration.

The different optical properties of the prismatic arrays 1 and 2 enables an optically variable effect to be generated such that on viewing the device in FIG. 3 from above the substrate and normal to the plane of the clear polymeric film (direction C) prismatic array 1 appears transparent while in contrast prismatic array 2 is totally reflecting and appears "metallic". If the device is now tilted away from the normal with the direction of tilt perpendicular to the long axes of the prisms then at intermediate viewing direction E the device appears uniformly transparent. On continuing to tilt, and viewing along direction D, the appearance of the device is inverted from that originally observed at normal incidence, such that prismatic array 1 is now totally reflecting and appears "metallic" and prismatic array 2 appears transparent. If the device is tilted still further, and viewed along direction F, prismatic array 1 switches back to appearing transparent and prismatic array 2 remains transparent resulting in the film having a uniform transparent appearance.

In a preferred embodiment prismatic arrays 1 and 2 in FIG. 3 are replicated onto the clear polymeric film in the form of identifying images. In one example, illustrated in FIG. 6, prismatic array 1 is replicated in the form of the letters DLR and prismatic array 2 is replicated in register such that the two replicated structures do not overlap. When viewed normally along direction C prismatic array 1, in the form of the letters DLR, is substantially transparent, but the letters DLR are visible as a negative image against the "metallic" appearance of the totally reflecting background resulting from prismatic array 2. On tilting the film and viewing along direction E the background switches from being totally reflecting to being substantially transparent and the device now has a uniform transparent appearance. On tilting the film further and viewing along direction D perpendicular to the long axes of the prisms the DLR letters now appear "metallic", because prismatic array 1 is now totally reflecting, against a substantially transparent background resulting from prismatic array 2. If the device is tilted still further and viewed along direction F the DLR letters formed by prismatic array 1 switch back to appearing transparent and the background remains transparent such that the film has a uniform transparent appearance and the letters DLR cannot be observed. In this example a negative "metallic" image switches to a positive "metallic" image when tilting off-axis from normal incidence. If the prismatic arrays in the current example are swapped over such that the image is now generated from prismatic array 2 and the background from prismatic array 1 the reverse switch from a positive "metallic" image to a negative "metallic" image is observed when tilting off-axis from normal incidence.

Figure 7:
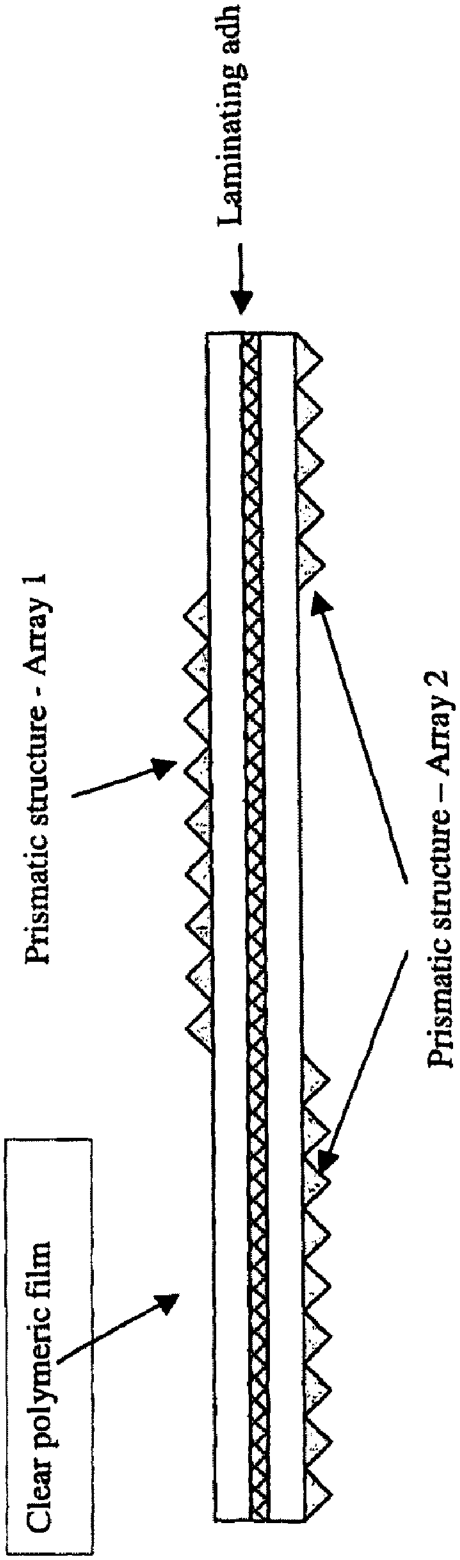
FIG. 7 is a cross-section through a second example of the invention.

An alternative device construction of the current invention is one in which the device comprises a laminate film. FIG. 7 illustrates an example of a laminate construction for the first aspect of the current invention. In this embodiment prismatic array 1 is replicated on one surface of the first clear polymeric film and prismatic array 2 is replicated on one surface of the second clear polymeric film. The non-structured surfaces of the clear polymeric films are then laminated together. A layer of suitable adhesive may be required, for this process, applied between the non-structured surfaces of the clear polymeric films.

The device constructions described above can be slit or cut into patches, foils, stripes strips or threads for incorporation into plastic or paper substrates in accordance with known methods.

Figure 8:
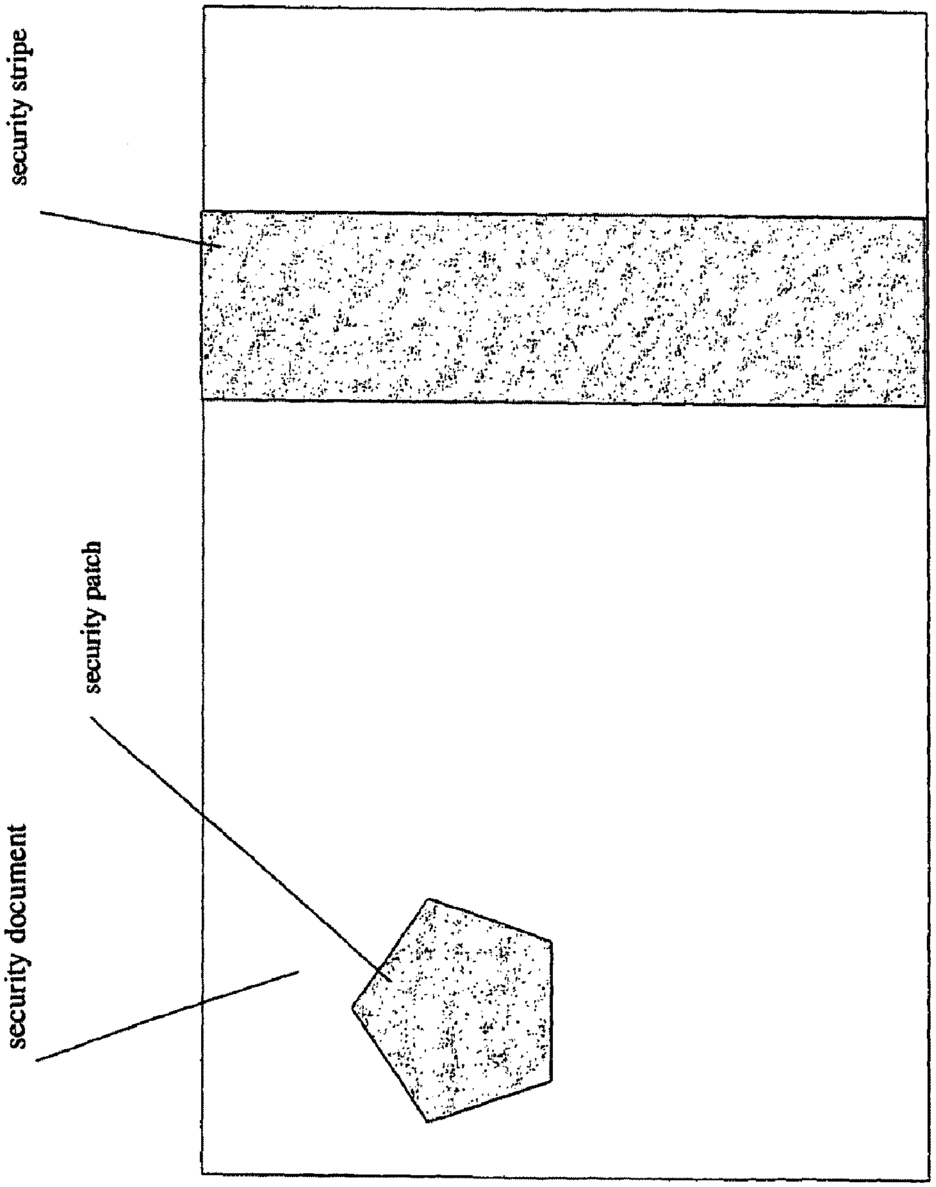
FIG. 8 illustrates an example of a security document incorporating a security device according to the invention.
Figure 9:
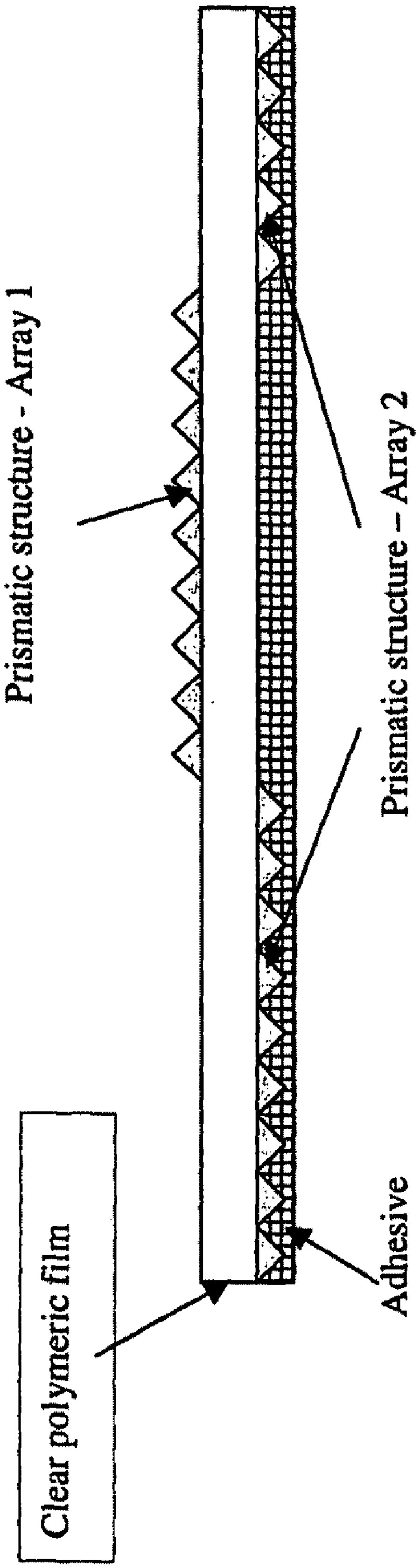
FIG. 9 illustrates a modified form of the FIG. 3 example in cross-section.
Figure 10:
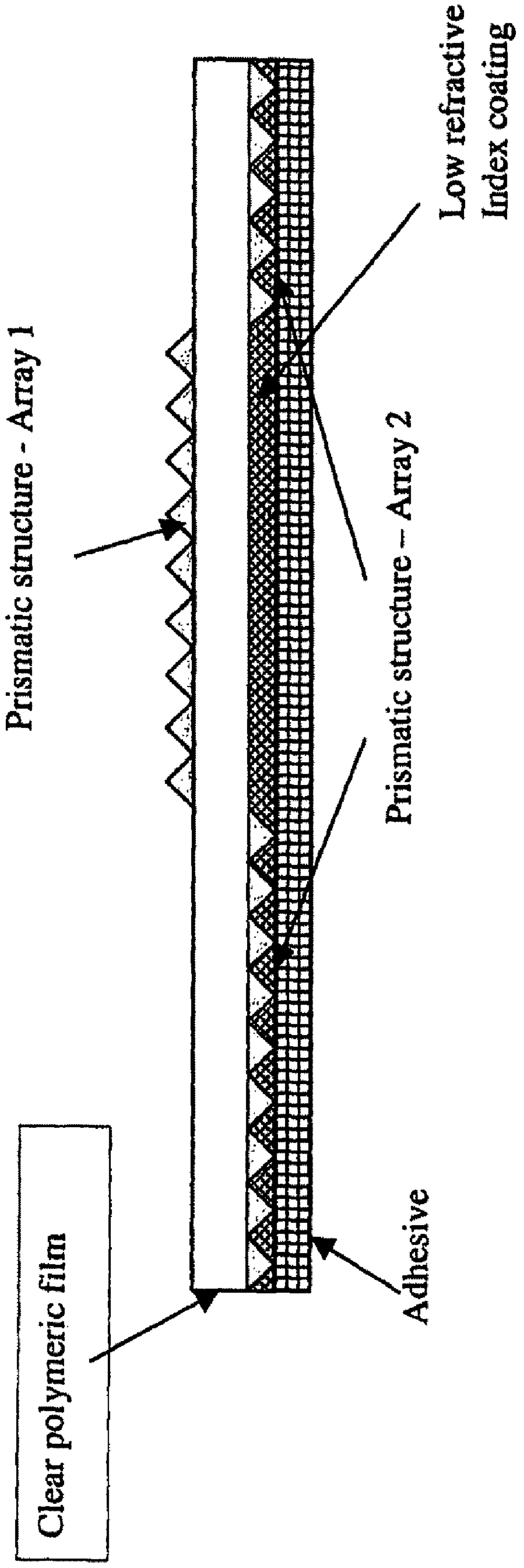
FIG. 10 illustrates a further modified form of the FIG. 9 example in cross-section.

In one embodiment, the current invention can be incorporated into a security document as a security patch or stripe, as illustrated in FIG. 8. FIG. 9 illustrates an example cross-section of a security patch or stripe, in which the device construction illustrated in FIG. 3 has been modified by the application of a transparent heat or pressure sensitive adhesive to the outer surface containing prismatic array 2. Prismatic arrays 1 and 2 consist of an array of parallel linear prisms with a prism pitch of 20 μm and a prism height of 10 μm. The device illustrated in FIG. 9 can be transferred to a security document by a number of known methods including hot stamping and the method described in U.S. Pat. No. 5,248,544. In order for the prismatic arrays in FIG. 9 to exhibit TIR the prismatic material must have a higher refractive index than the adhesive layer. An alternative construction is to include a low refractive index coating between the adhesive layer and the prismatic arrays as illustrated in FIG. 10.

Figure 11:
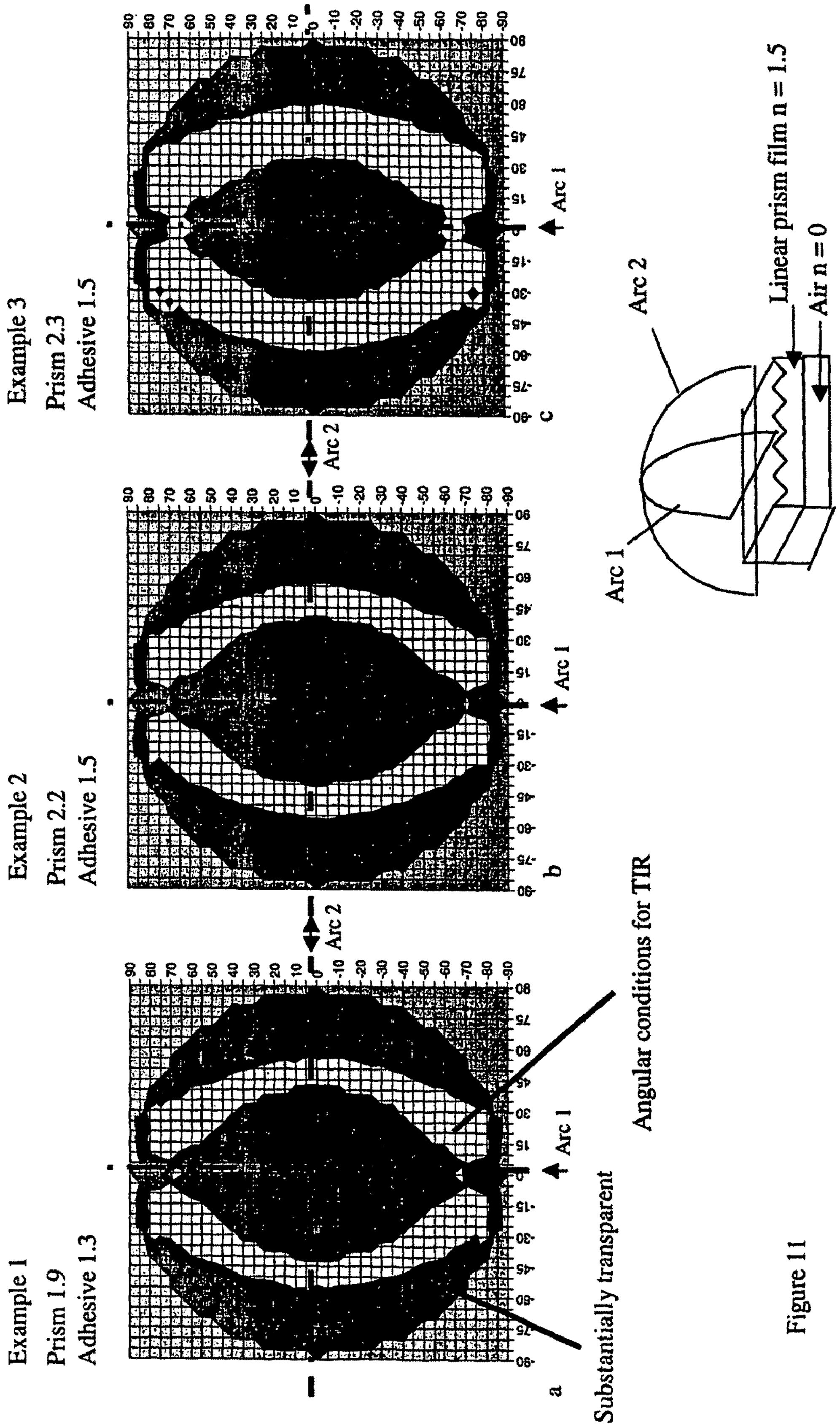
FIGS. 11 and 12 are polar plots showing how the angular range in which TIR occurs varies with refractive index for the construction shown in FIG. 9.
Figure 12:
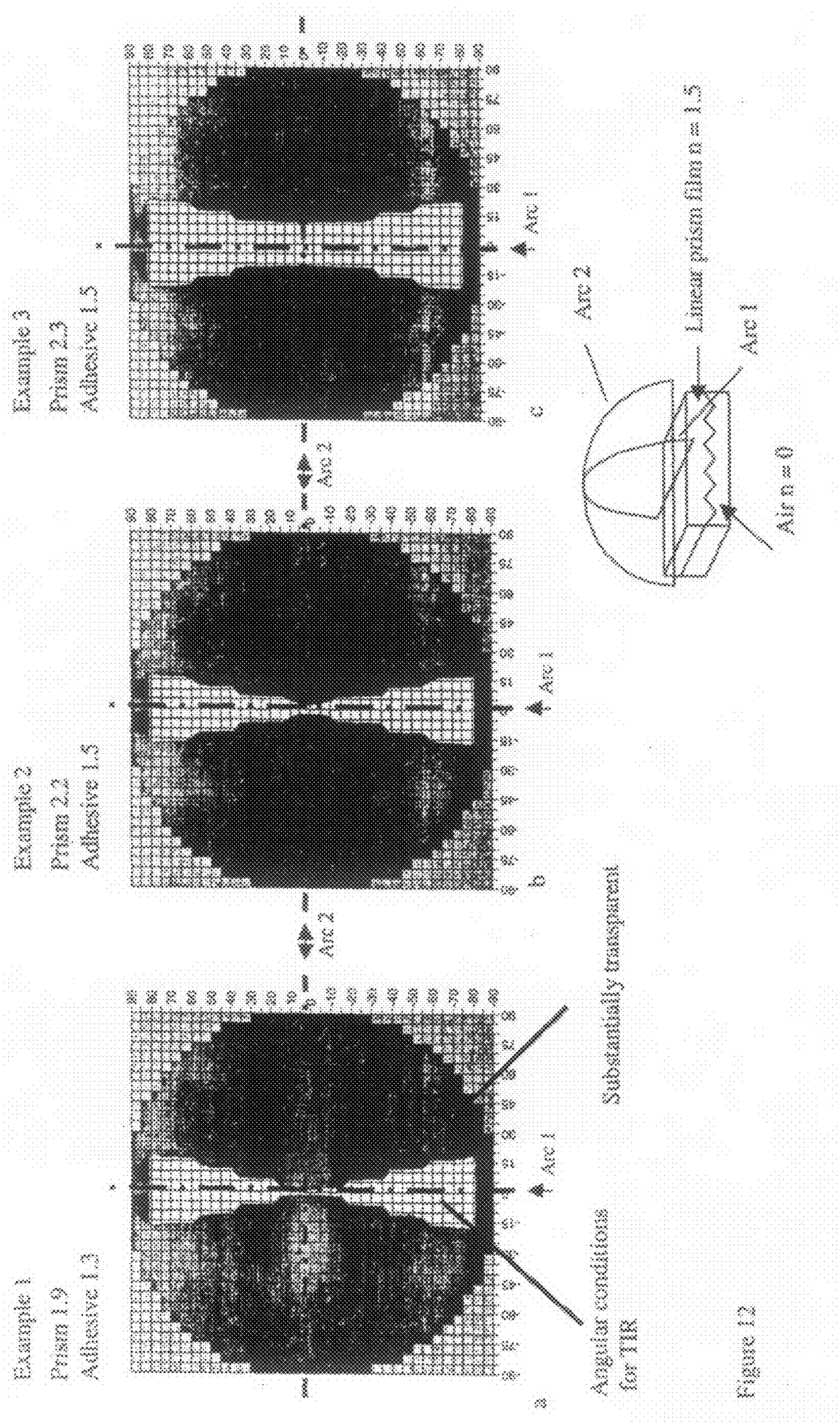

The polar plots in FIGS. 11 and 12 show how the angular range in which TIR occurs varies with the refractive index difference between the prismatic film and the adhesive/coating for the construction shown in FIG. 9. FIG. 11 shows the polar plots for prismatic array 1 in FIG. 9, i.e. an array of parallel linear prisms in the prisms-up configuration. The refractive index of the clear polymeric film is assumed to be constant and at an intermediate value between the refractive index of the prism material and the adhesive. In example 1 (FIG. 11*a*) the prismatic material has a refractive index of 1.9 and the adhesive/coating has a refractive index of 1.3. The polar plot shows that example 1 would provide an acceptable construction for the first aspect of the invention, as when the direction of tilt is perpendicular to the long axes of the linear prisms TIR occurs for angles of incidence between ~45-55° (i.e $\theta_{spu}$=45°). In example 2 the refractive index of the adhesive/coating is a more realistic 1.5 and the prismatic material has a refractive index of 2.2. The polar plot in FIG. 11*b* shows that example 2 would also provide an acceptable construction for the first aspect of the invention as when the direction of tilt is perpendicular to the long axes of the linear prisms TIR occurs for angles of incidence between ~40-55° (i.e $\theta_{spu}$=40°). Increasing the refractive index of the prismatic material to 2.3 in contact with an adhesive/coating of refractive index 1.5 enables TIR to occur for angles of incidence between ~30-55° (i.e $\theta_{spu}$=30°) when the direction of tilt is perpendicular to the long-axes of the linear prisms, as illustrated in example 3 (FIG. 11*c*).

FIG. 12 shows the equivalent polar plots for prismatic array 2 in FIG. 9, i.e. an array of parallel linear prisms in the prisms-down configuration. In example 1 (FIG. 12*a*) the prismatic material has a refractive index of 1.9 and the adhesive/coating has a refractive index of 1.3. The polar plot in FIG. 12*a* shows that example 1 provides an acceptable construction for the first aspect of the invention as when the direction of tilt is perpendicular to the long axes of the linear prisms TIR occurs at normal incidence and angles of incidence up to approximately 2-3° away from the normal (i.e $\theta_{spd}$=2-3°). A similar result is obtained for example 2 where the refractive index of the adhesive is a more realistic 1.5 and the refractive index of the prismatic material is 2.2 as shown in the polar plot in FIG. 12*b*. In example 3 (FIG. 12*c*), where the refractive index of the prismatic material is increased to 2.3 in contact with an adhesive/coating of refractive index 1.5, TIR occurs at normal incidence and angles of incidence up to approximately 10° away from the normal (i.e $\theta_{spd}$=10°) when the direction of tilt is perpendicular to the long axes of the linear prisms.

FIGS. 11 and 12 highlights how the switching angles $\theta_{spu}$ and $\theta_{spd}$ for a certain rotational orientation can be modified by varying the refractive index. For example the switch angle $\theta_{spd}$, when tilted perpendicularly to the long axes of the linear prisms, has been increased from ~3° to ~10° by increasing the refractive index of the prism material from 2.2 to 2.3 for an adhesive with a refractive index of 1.5. Increasing the switch angle away from the normal for the prisms-down configuration is beneficial as it provides a greater range of angles over which the material is totally reflecting and appears "metallic".

In order to achieve the refractive index differences illustrated in the above examples and produce a functioning device of the current invention careful material selection is required. Most organic polymer materials, including heat or pressure sensitive adhesives, have refractive indices in the range 1.4-1.6. However coating and adhesives based on fluorinated polymers have lower refractive indices, for example Teflon® AF manufactured by Dupont has a refractive index of ~1.3 and can be used as a low-refractive index coating or covering for optical devices and therefore could be employed as the intermediate coating layer in FIG. 10.

The choice of suitable high refractive index prismatic materials for the current invention depends on the method of replication. UV curable polymers employing free radical or cationic UV polymerisation suitable for the UV casting process typically have refractive indices in the range 1.4-1.6. The refractive index can be increased to ~1.7 by using UV curable monomers/oligomers with highly conjugated (ring-) structure, heavy element substitution (Br, I), high functionality and high molecular weight. However the examples in FIGS. 11 and 12 indicate that a refractive index of at least 1.9 and more preferably greater than 2.1 is required for the prismatic material to produce a functioning device. Suitable high refractive index materials for the current invention include inorganic-organic hybrids where high refractive index inorganic nanoparticles, for example $TiO_2$, are dispersed in a polymer resin suitable for UV casting to produce a transparent high refractive index coating. The polymer resin would be chosen such that it is suitable for UV casting and examples include photo-crosslinkable acrylate or methacrylate oligomeric resins. Examples of cationic systems include cycloaliphatic epoxides. Hybrid polymer systems can also be employed combining both free radical and cationic UV polymerization. Further examples of polymer systems suitable for the formation of prismatic films by UV casting are given in U.S. Pat. No. 4,576,850 and U.S. Pat. No. 5,591,527. Methods for dispersing inorganic nanoparticles into polymer systems suitable for UV casting are described in US2002119304, U.S. Pat. No. 6,720,072 and WO02058928.

An optional protective coating/varnish may be applied to the outer surface containing the prismatic array 1 in FIG. 9. The presence of the varnish will result in the switching angle $\theta_{spu}$ for prismatic array 1 being further away from normal incidence because a varnish/prism interface will have a smaller refractive index difference than an air/prism interface.

The following examples illustrated in FIGS. 13-19 are based on a linear prismatic array with a refractive index of 2.2 and an adhesive/coating layer with a refractive index of 1.5. The linear prisms have a pitch of 20 μm and a prism height of 10 μm. The linear prisms are oriented such that their long axes are perpendicular to the direction of tilt.

Figure 13:
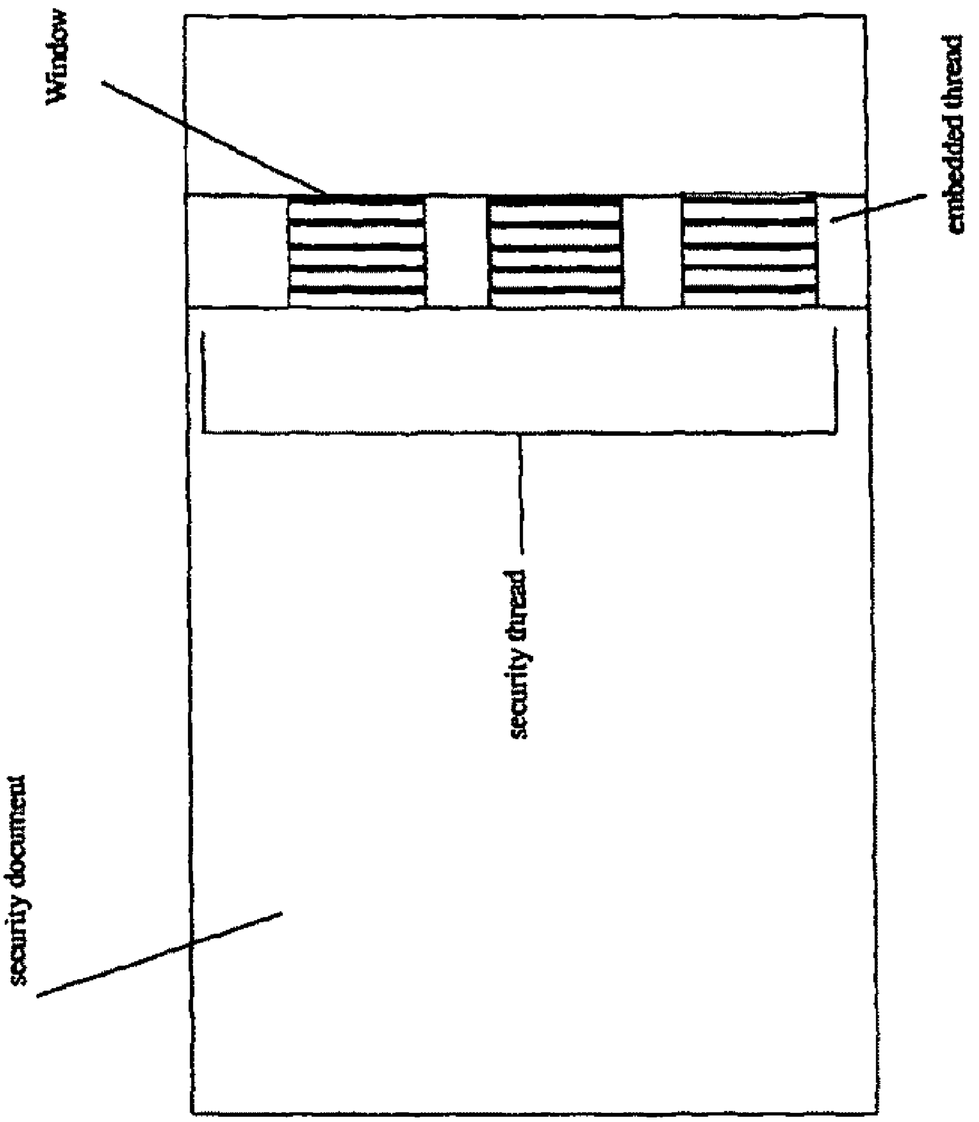
FIG. 13 illustrates an example of the invention embedded in a security thread.

In one embodiment, the first aspect of the current invention could be incorporated into a security paper as a windowed thread. FIG. 13 shows a security thread, formed by a device according to the invention, with windows of exposed thread and areas of embedded thread in a document. EP860298 and WO03095188 describe different approaches for the embedding of wider threads into a paper substrate. Wide threads are particularly useful as the additional exposed area allows for better use of optically variable devices such as the current invention.

Figure 14:
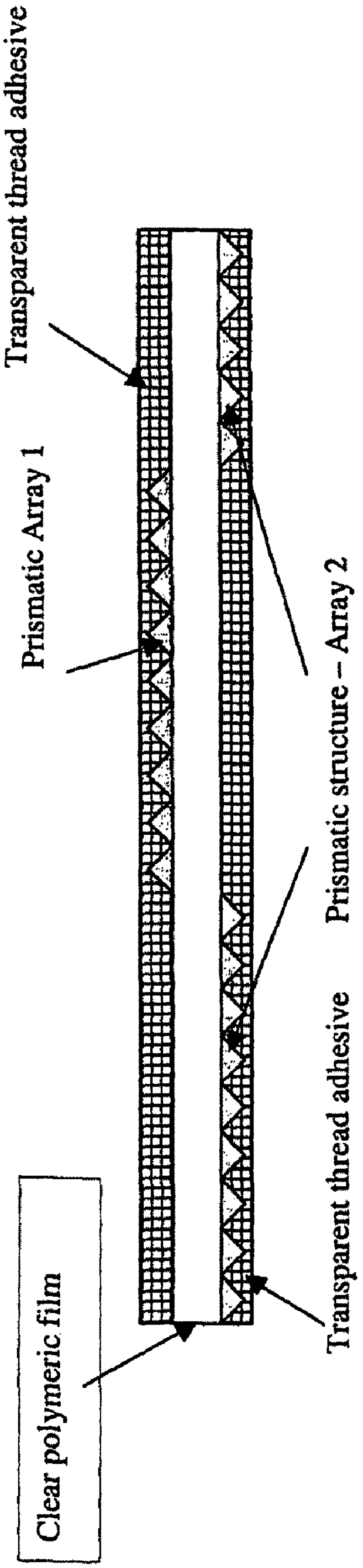
FIG. 14 is a cross-section through an example of the security device for use in the FIG. 13 application.

An example cross-section is shown in FIG. 14 in which the device construction illustrated in FIG. 3 has been modified by the application of a layer of transparent colourless adhesive to the outer surface containing prismatic array 1 and the application of a second layer of transparent adhesive to the outer surface containing prismatic array 2. The prismatic material and the transparent adhesive are selected such that the prismatic material has a significantly higher refractive index than the transparent adhesive. An alternative construction is to include a low refractive index coating between the adhesive layer and the prismatic arrays.

Figure 6:
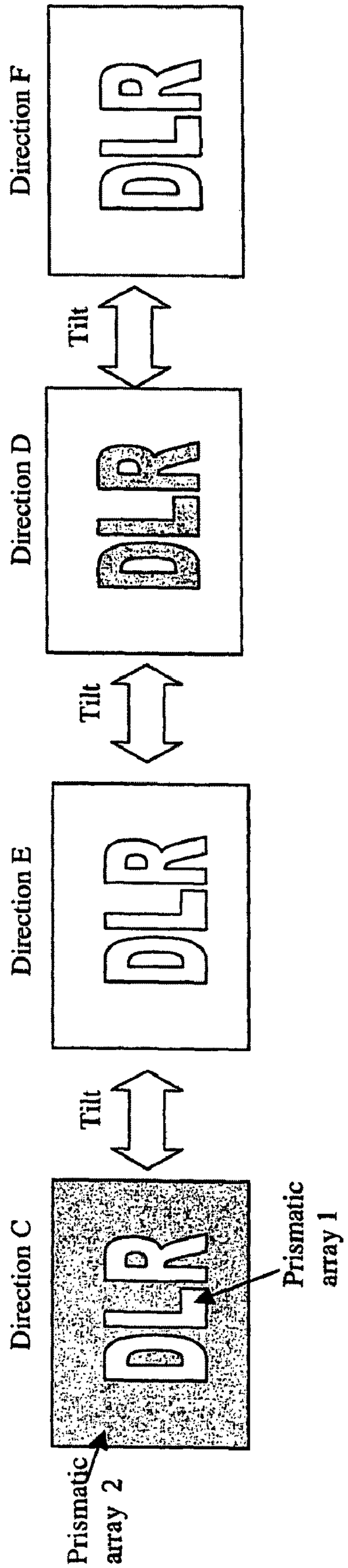
FIG. 6 illustrates the appearance of an example of the invention when viewed from different angles.

In a preferred embodiment prismatic arrays 1 and 2 are replicated onto the clear polymeric film in the form of identifying images for example as described in FIG. 6. The identifying image is repeated along the security thread such that one set of identifying images is always visible in the windowed region of the banknote. The incorporation of the security thread into the paper can be controlled such that prismatic array 1 is always on the top surface of the windowed region of the banknote and in this case the security feature will follow the same switching sequence on tilting as described in FIG. 6. Alternatively the security thread can be incorporated into the paper such that prismatic array 2 is always on the top surface of the windowed region of the banknote. In this case the security feature will follow the inverse switching sequence to that described in FIG. 6, i.e. the image viewed at normal incidence along direction C in FIG. 6 will be viewed off-axis along direction D and vice-versa. An advantage of the security thread shown in FIG. 14 is that it is not necessary to control the vertical orientation of the thread because one variant of the security feature is always visible in the windowed region of the banknote. The fact that the security device is viewed through the top layer of adhesive rather than air will result in the switching angle $\theta_{spu}$ for prismatic array 1 or prismatic array 2, depending on the vertical thread orientation, being shifted away from normal incidence because a adhesive/prism interface will have a smaller refractive index difference than an air/prism interface. If the vertical orientation of the thread is to be controlled then the top layer of adhesive may be optionally omitted to enable an air/prism interface on the top surface of the device.

Figure 15:
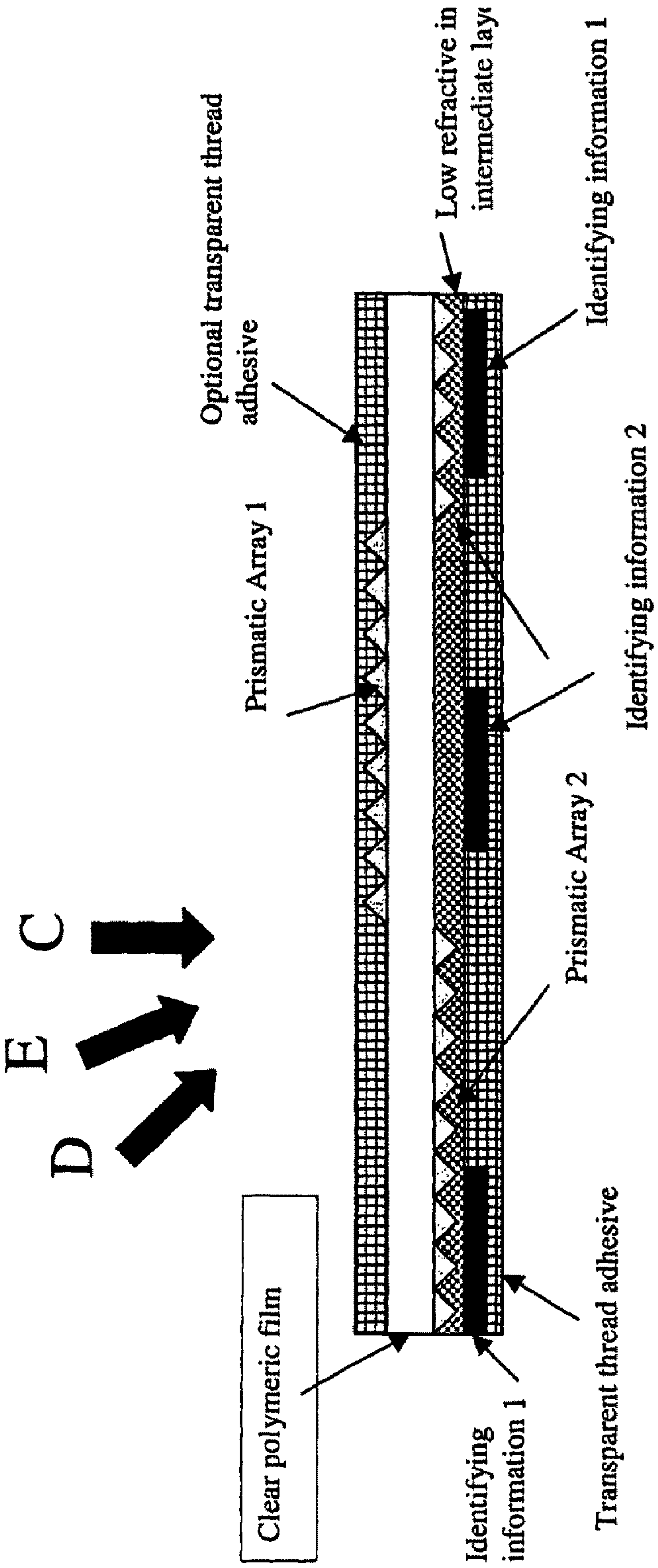
FIG. 15 illustrates an example of the device with a printed layer and incorporated into a security thread.
Figure 16:
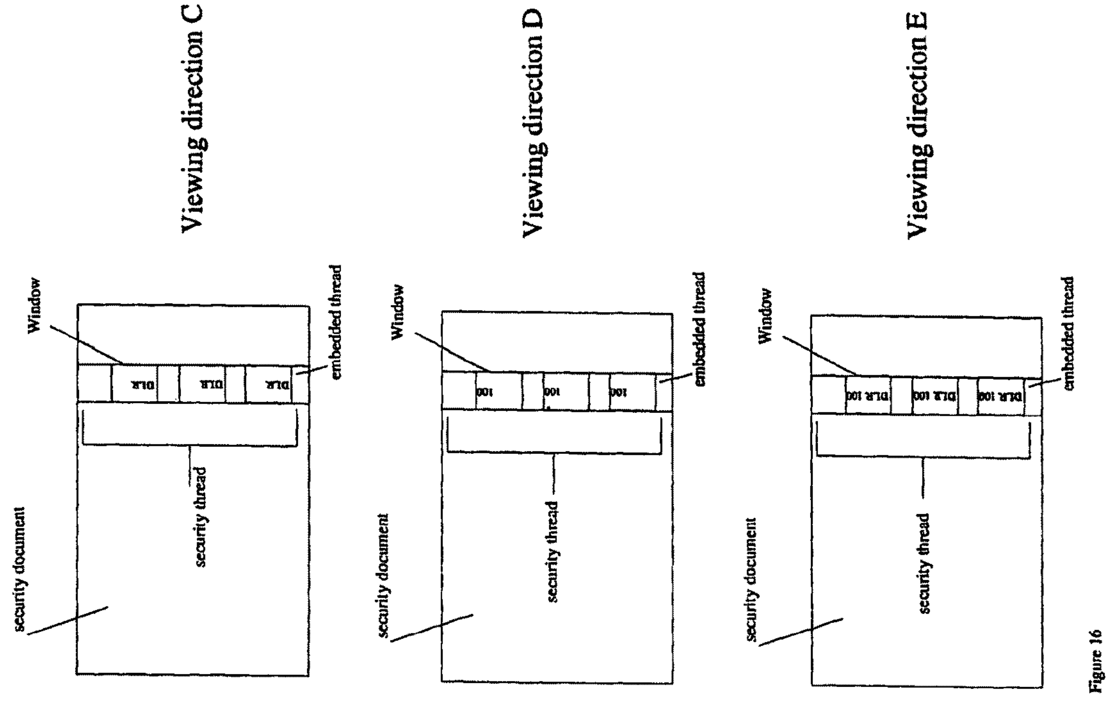
FIG. 16 illustrates an example switching sequence for a windowed thread having the FIG. 15 construction.

In a further embodiment a printed layer of identifying information can be incorporated into the security thread as illustrated in FIG. 15. A low refractive index intermediate layer is applied to create the conditions for total internal reflection such that light is travelling from the higher refractive index prismatic material to the lower refractive index intermediate coating. The incorporation of the security thread into the paper is controlled such that prismatic array 1 is on the exposed surface of the windowed region of the banknote. On viewing the device in FIG. 15 from above the substrate and normal to the plane of the clear polymeric film (direction C) prismatic array 1 appears transparent and the identifying information 1 directly underneath prismatic array 1 can be observed, while in contrast prismatic array 2 is totally reflecting and appears metallic and the identifying information 2 directly underneath prismatic array 2 is concealed. If the device is now tilted away from the normal and viewed off-axis (direction D) the appearance of the device is inverted, such that prismatic array 1 is now totally reflecting and appears metallic concealing the underlying identifying information 1 and prismatic array 2 appears transparent and reveals the underlying identifying information 2. At an intermediate viewing direction E between C and D, such that the angle of tilt is between $\theta_{spu}$ for prismatic array 1 and $\theta_{spd}$ for prismatic array 2, both prismatic array 1 and prismatic array 2 are substantially transparent and all of the identifying information is revealed. The prismatic arrays can be applied in register with the identifying information such that different components are revealed at different tilt angles. FIG. 16 illustrates an example switching sequence for a windowed thread with the construction in FIG. 15 where identifying information 1 is in the form of the letters DLR and identifying information 2 is in the form of the number 100. When viewed normally along direction C prismatic array 1 is substantially transparent and the letters DLR are visible in the window region but prismatic array 2 is totally reflecting and conceals the number 100. On tilting the film and viewing along direction D prismatic array 2 is substantially transparent and the number 100 is visible in the window region but prismatic array 1 is totally reflecting and conceals the letters DLR. At the intermediate viewing direction E both prismatic arrays are substantially transparent and both the letters DLR and the number 100 are visible.

In a further embodiment the security device of the current invention could be incorporated into the document such that regions of the device are viewable from both sides of the document. One method for incorporating a security device such that it is viewable from both sides of the document is described in EP 1141480. Here a security thread is selectively exposed on one side of the security document and fully exposed on the second side to produce a transparent area, as illustrated in FIG. 17*a*. This method allows for the insertion of considerably wider security threads into documents. FIG. 17*b* shows a cross-sectional view of a security thread that could be incorporated in the manner described in EP1141480. A prismatic array is replicated on side 1 of the clear polymeric film and an adhesive layer is coated onto the prismatic array to promote bonding of the thread to the secure document. The selected adhesive has a significantly lower refractive index than the prismatic material. The security thread is incorporated into the document such that side 2 is fully exposed on the front of the document and side 1 is exposed in a transparent area on the back of the document. When the security device is viewed from the back of the document (side 1) the prismatic array is viewed in the prisms-up configuration and therefore at normal incidence the film appears transparent and a transparent area is observed. If the sample is tilted off-axis, while still viewing from the back of the document, the film is now totally reflecting and becomes "metallic" and the presence of the transparent area is concealed. When the security device is viewed from the front of the document (side 2) the prismatic array is viewed in the prisms-down configuration and therefore at normal incidence the film is totally reflecting and appears "metallic" and the presence of the transparent area is concealed but on tilting off-axis the film becomes transparent revealing a transparent area. The fact that the transparent to "metallic" switch is inverted by viewing from the opposite side of the document enables the document to be easily authenticated by placing the transparent area on a printed image/document. When viewed normally from one side of the document the image will be visible through the transparent aperture, but when the banknote is turned over the image will be concealed by an apparently reflective "metallic" film.

A further embodiment of a security device comprising a prismatic array suitable for viewing from either side of the document is shown in FIG. 18. The device construction shown in FIG. 18 is as that shown in FIG. 17*b* but with an additional low refractive index intermediate layer applied to the prismatic array. An image with a constant "metallic" appearance, irrespective of viewing angle, is then applied to the intermediate layer such that the colour of the metallic image matches that of the prismatic film in its totally reflecting "metallic" state. The metallic image could be applied in the form of a vapour deposited metallised layer, for e.g. Al, or in the form of a metallic ink. Another method of producing a metallised layer is to selectively remove areas from a uniform metallised layer. This could be achieved by printing on an etchant solution to remove selected areas of metal, or printing a protective layer on the metal then removing unprotected areas using an etch solution. A low refractive index intermediate layer is applied to create the conditions for total internal reflection such that light is travelling from the higher refractive index prismatic material to the lower refractive index intermediate coating. When viewed from side 2, the prismatic array is viewed in the prisms-down configuration, and at normal incidence the prismatic array will be totally reflecting with a strong "metallic" appearance and the image will be concealed. As the film is tilted it becomes transparent and reveals the metallised image. When viewed from side 1, the prismatic array is viewed in the prisms-up configuration and the inverse switch will occur i.e. at a normal angle of incidence the film will be transparent and the image can be observed and when tilted off-axis the film will switch to a bright "metallic" appearance matching the appearance of the metallised image resulting in the image disappearing into the background.

FIG. 19 shows a cross-section of a security thread suitable for viewing from either side of the document. The construction comprises a substantially clear polymeric film of polyethylene terephthalate (PET) or the like. A localised prismatic surface structure, comprising an array of parallel linear prisms, is formed on both surfaces of the clear polymeric film. A transparent adhesive is applied to the surface of the clear polymeric film comprising prismatic array 2. The security thread is incorporated into the document such that side 2 is fully exposed on the front of the document and side 1 is exposed in a transparent area on the back of the document. When viewed from the front of the security document (side 2) prismatic array 1 is in the prisms-up configuration and prismatic array 2 is in the prisms-down configuration. The prismatic arrays are in the opposite configuration when the security document is viewed from the back of the document. The prismatic arrays are replicated as described for FIG. 6 such that prismatic array 1 is replicated in the form of the letters DLR and prismatic array 2 is replicated in register such that the two replicated structures do not overlap. When viewed from the front of the document and tilting from normal incidence to off-axis (viewing direction C to E to D to F) the switching sequence as described in FIG. 6 will occur on the exposed surface of the polymer film, see FIG. 20. In contrast when viewed from the back of the document and again tilting from normal incidence to off-axis the inverse switching sequence is observed in the transparent area.

In an additional embodiment an enhanced optically variable effect is created by combining the transparent to "metallic" switch effect generated by the various security devices described above with a printed image on a security document. The "metallic" to transparent switch can be used to hide and reveal the printed information and to more clearly associate the device with the document. In a more advanced version the switching image would complete the printed image or locate within the printed image. In one example the printed information is a serial number. The security device, which has the construction shown in FIG. 9, is applied over the serial number. Prismatic arrays 1 and 2 are replicated in the form of blocks and the device is registered with the serial number such that prismatic array 1 is positioned over every second digit and prismatic array 2 is positioned over the digits not covered by prismatic array 1. At normal incidence blocks comprising prismatic array 2 appear "metallic" such that half the digits are concealed as shown in FIG. 21, while blocks comprising prismatic array 1 are substantially transparent allowing the other digits to be observed. On tilting off-axis the appearance of the two prismatic arrays switches such that prismatic array 1 appears "metallic" and prismatic array 2 is substantially transparent and therefore the digits previously concealed are now revealed and vice versa. At an intermediate tilt between the normal and off-axis positions both prismatic arrays will appear transparent and the full serial number is revealed.

Referring now to FIG. 22 there is illustrated a cross-section of a substrate typical of the construction of the second aspect of the current invention for use in security or authenticating devices. The construction comprises a substantially clear polymeric film of polyethylene terephthalate (PET) or the like. A localised prismatic surface structure, comprising two arrays of a series of parallel linear prisms (prismatic array 3 and prismatic array 4) where the arrays are rotated relative to each other by ~90° within the plane of the substrate, is formed on the lower surface of the clear polymeric film. The linear prisms have a pitch of 20 μm and a height of 10 μm. The device can be made suitable for application as a security patch or stripe by the application of a heat or pressure sensitive adhesive to the outer surface containing the prismatic arrays. The device illustrated in FIG. 22 can be transferred to a security document by a number of known methods including hot stamping and the method described in U.S. Pat. No. 5,248,544. When viewed from the top of the device prismatic array 3 and prismatic array 4 are in the prisms-down configuration.

The second aspect of the current invention is dependent on the fact that the reflective properties of the prismatic structures vary as the prismatic array is rotated relative to the viewing direction. An array of parallel linear prisms is particularly suitable for the second aspect of the current invention as the angular viewing conditions at which TIR occurs is dependent on the degree of rotation between the tilt direction and the long axes of the linear prisms. This variation in reflectivity is illustrated using polar plots in FIG. 12 for example constructions with the prisms-down configuration where different refractive indices for the prismatic material and for the adhesive have been used. FIG. 12 shows that TIR primarily occurs when the direction of tilt is parallel to the long axes of the linear prisms (i.e. tilting along arc 1) and, if there is a significant difference in refractive index between the prismatic material and the adhesive, at all angles of incidence. A significant difference in refractive index is typically ≧0.4 if the refractive index of the adhesive is between 1.3-1.6. In general, the refractive index of the prismatic structure is at least 1.7, preferably at least 1.9, and most preferably at least 2.1. In contrast when the direction of tilt is perpendicular to the long axes of the linear prisms (i.e. tilting along arc 2), for a device with a significant difference in refractive index between the prismatic material and the adhesive, TIR occurs at normal incidence and for a limited tilt range away form normal incidence.

FIG. 23 illustrates a secure document, for example a banknote, containing one example of the optically variable effect that could be generated from the security device in FIG. 22. Prismatic array 3 is replicated onto the clear polymeric film in the form of a star and prismatic array 4 is replicated over the active area not covered by prismatic array 3 such that it forms the background area. Prismatic arrays 3 and 4 comprise a series of parallel linear prisms and are replicated such that the long axes of the linear prisms forming the star (prismatic array 3) are substantially perpendicular to the long axes of the prisms forming the background area (prismatic array 4). The lines in FIG. 23 schematically represent the long axes of the linear prisms. The long axes of the prisms forming the background area are parallel to long axis of the secure document and the long axes of the prisms forming the star are parallel to short axis of the secure document. In this example the prismatic material has a refractive index of 2.2 and the adhesive has a refractive index of 1.5, and the angular dependence of TIR on rotation is as shown in FIG. 12*b*. When viewed normally both prismatic array 3 and prismatic array 4 are totally reflecting and the film has a uniform "metallic" appearance and the star is not visible. On tilting the device a few degrees off-axis, ~10°, and viewing parallel to the short axis of the secure document (direction A), the background area becomes transparent but the star remains "metallic" and is therefore revealed. If the device remains off-axis and is rotated such that it is viewed at an angle of 45° to the long axis of the secure document (direction C) the star becomes substantially transparent and the background area remains transparent resulting in the image of the star being concealed. If the device remains off-axis and is rotated by a further 45° and viewed along the long axis of the secure document (direction B) the image is inverted from that observed along direction A with the star switching from "metallic" to transparent and the background area switching from transparent to "metallic".

A security device of the type shown in FIG. 23 exhibits three anti-counterfeit aspects; a clearly identifiable "metallic" to transparent switch, a latent image revealed by tilting away from the normal and a positive/negative image switch when rotated off-axis. The device is therefore straightforward for the member of the public to authenticate but very difficult to counterfeit due to the requirement to replicate all three security aspects.

Referring now to FIG. 24 there is illustrated a cross-section of a substrate typical of the construction of the second aspect of the current invention for use in security or authenticating devices. The construction is as that shown in FIG. 22 other than that the prismatic arrays are now formed on the upper surface of the clear polymeric film such that when viewed from the top of the device prismatic array 5 and prismatic array 6 are both in the prisms-up configuration.

In some cases, this structure can be formed on a carrier substrate which is then removed on application to a document such that the prismatic structure is a stand-alone structure.

FIG. 25 illustrates a secure document containing one example of the optically variable effect that could be generated from the security device in FIG. 24. Prismatic arrays 5 and 6 are replicated to form the same identifying images as prismatic arrays 3 and 4 respectively in FIG. 23. Prismatic arrays 5 and 6 comprise a series of parallel linear prisms and are replicated such that the long axes of the linear prisms forming the star (prismatic array 5) are substantially perpendicular to the long axes of the prisms forming the background area (prismatic array 6). The lines in FIG. 25 schematically represent the long axes of the linear prisms. The long axes of the prisms forming the background area are parallel to long axis of the secure document and the long axes of the prisms forming the star are parallel to short axis of the secure document. In this example the prismatic material has a refractive index of 2.2 and the adhesive has a refractive index of 1.5, and the angular dependence of TIR on rotation is as shown in FIG. 11*b*. When viewed normally both prismatic array 5 and prismatic array 6 are substantially transparent and the film has a uniform transparent appearance and the star is not visible. On tilting the device off-axis, 35-45°, and viewing parallel to the short axis of the secure document (direction A), the background area becomes "metallic" but the star remains transparent thus revealing the star. If the device remains off-axis, at 35-45° from the normal, and is rotated by 90° and viewed along the long axis of the secure document (direction B) the image is inverted from that observed along direction A with the background area switching from "metallic" to transparent and the star switching from transparent to "metallic".

The construction shown in FIG. 22 is particularly suitable for use in a document that enables it to be viewed from either side of the document, for example in a transparent aperture as described in EP1141480 or in a window of a polymer banknote as described in WO8300659. The prismatic arrays are replicated as described for FIG. 23 and the device is incorporated into the document such that when viewed from the front of the document prismatic arrays 3 and 4 are in the prisms-down configuration and when viewed from the back of the document prismatic arrays 3 and 4 are in the prisms-up configuration. On viewing the device from the front of the document at normal incidence the device appears "metallic" and on tilting follows the switch sequence as illustrated in FIG. 23. However when viewing from the back of the document device appears transparent and follows the switching sequence as illustrated in FIG. 25. The different but related switching sequence on either side of the transparent aperture provides an unexpected and highly memorable security feature easily recognisable by the general public.

In an alternative embodiment of the second aspect of the invention the security device comprises multiple arrays of a series of parallel linear prisms where the arrays are rotated relative to each other within the plane of the substrate. FIG. 26 shows the angular dependence of TIR on rotation for an array of linear prisms in the prisms-down configuration where the refractive index of the prism material is 2.3 and the refractive index of the adhesive/coating is 1.5. When viewed normally the film is totally reflecting and has a "metallic" appearance. On tilting the device off-axis such that the direction of tilt is perpendicular to the long axes of the linear prisms, along arc 2, the switching angle $\theta_{spd}$ from totally reflecting to transparent is 100. On rotating the film 45° such that the direction of tilt is now along arc 3, $\theta_{spd}$ increases to 15°. Increasing the rotation further to 60° such that the direction of tilt is now along arc 4 increases $\theta_{spd}$ to 22°. As the angle between the viewing direction and the perpendicular to the long axes of the linear prisms increases the tilt angle at which the switch from brightly reflecting to transparent occurs increases i.e. becomes increasingly oblique. The arrays can form separate images or component parts of one image and the fact that each array can exhibit a different switching angle enables more complex image-switching devices to be generated.

The second aspect of the current invention is not limited to the use of prismatic arrays comprising parallel linear prisms. It is possible to use any prismatic array where the reflective properties of the array are dependent on the angular rotation of the array within the plane of the array. An example of an alternative prismatic structure is an array of hexagonal-faced corner cubes as shown in FIG. 27 in the prisms-up configuration. A hexagonal-faced corner cube is a standard corner-cube (i.e. triangular-faced) where the corners of the triangular front face have been removed to form a hexagon. The polar plot in FIG. 28 shows the angular range in which TIR occurs for an array of hexagonal-faced corner cubes with a prism height of 8.2 μm and a hexagon side length of 6.7 μm. For the example shown, the refractive index of the prism material is 1.5 and the prisms are in contact with air, which has a refractive index of ~1. The prismatic film is oriented such that the apexes of the prisms are pointing away from the viewer (i.e. prisms-down configuration). FIG. 28 shows that TIR occurs for angles of incidence between normal incidence and 20° irrespective of the rotation of the array. However on tilting further off-axis the array switches to substantially transparent for all viewing directions and remains transparent unless the viewing direction is parallel to one of the grooves defining the facets in which case the array switches back to its totally reflecting state. This occurs when the array is viewed parallel to one of the grooves defining the facets and tilted such that the groove moves away from the viewer. Referring to FIG. 28 if the device is viewed parallel to groove 1 defining facets 1 and 2 and tilted as shown along arc 1 such that the groove moves away from the viewer then at normal incidence the array will appear "metallic", switch to being substantially transparent at ~25°, then switch back to "metallic" at a tilt of ~45° and stay metallic until tilted beyond 70°. In contrast if the device is tilted along arc 1 such that the groove moves towards the viewer the array will switch from being metallic to substantially transparent at ~25° and remain transparent.

The optical properties of the hexagonal-faced corner cube array in FIG. 28 enables an optically variable effect to be generated. An example device would be one comprising two such arrays but rotated relative to each other by 90° such that when viewing the first array along arc 1 the second array is viewed along arc 2 and vice versa. One of the two arrays could be replicated in the form of an identifying image and a second replicated to form the background to the image. The film will appear "metallic" at normal incidence and a positive "metallic" image will be revealed when tilting off-axis away from the viewer along arc 2 of the prismatic array forming the image. A negative "metallic" image will be revealed on rotating the device 90° and tilting off-axis away from the viewer along arc 1 of the prismatic array forming the image.

Alternatively the arrays could be rotated relative to each other by 60° such that groove 1 of array 1 is parallel to groove 2 of array 2 for the array structure in FIG. 28. On tilting the device parallel to these grooves (i.e along arc 1 for array 1) array 1 will be totally reflecting off-axis when tilting away from the viewer and array 2 will be totally reflecting when tilting towards the viewer. The advantage of a 60° rotation is that it enables a tessellated structure such that there are no inactive regions at the boundaries of the two arrays.

The reflective properties of an array of prismatic structures of the type described in the current invention can be modified by varying the prismatic structure such that it no longer has a symmetrical cross-section. For example consider an array of parallel linear prisms where the facets makes an angle of approximately 45° with the base substrate and the angle between the facets is approximately 90°. If the structure is altered such that one of the facets makes an angle of 35° to the base substrate and the other facet makes an angle of 55° to the base substrate, as illustrated in FIG. 29, the apex is shifted to create an asymmetrical structure but the angle between the facets remains at 90°. The polar plots in FIG. 30 show how the angular range in which TIR occurs is altered by the creation of this asymmetrical structure when the structures are viewed in the prisms-down configuration. For this example the refractive index of the prismatic material is 2.2 and the refractive index of the contacting adhesive is 1.5. For the symmetrical structure when the direction of tilt is perpendicular to the long axes of the linear prisms (along arc 2) TIR occurs at normal incidence and angles of incidence up to approximately 2-3° away from the normal. In contrast for the asymmetrical structure, when the direction of tilt is perpendicular to the long axes of the linear prisms (along arc 2), the angular range in which TIR occurs is shifted such that it occurs for angles of incidence in the range 20-25° away from the normal. However the angular range exhibiting TIR is very small and does not offer a practical solution.

The asymmetrical linear prismatic structure in FIG. 29 is limited by the fact that light incident on the longer facet close to the base substrate does not reflect back out of the prismatic film even though it undergoes TIR when incident on the longer facet. This is illustrated in FIG. 29. Light ray 1 is refracted on entering the film at point a and is incident on the longer facet at an angle $\alpha$ to the normal such that it undergoes TIR at both the long and short facet and exits back through the smooth surface. However light ray 2 is refracted on entering the film at point b and is incident on the longer facet at the same angle α as ray 1 but at a point close enough to the base substrate that the reflected ray is now incident on the smooth surface rather than the shorter facet. Light ray 2 undergoes TIR at the smooth surface and does not exit the film and therefore is not reflected. Ray 3 is the limiting case in that it shows the location on the longer facet below which the incident light ray is no longer reflected onto the shorter facet and therefore a non-reflecting region is created. A solution to this problem is to create a truncated version of the asymmetrical structure as shown in FIG. 31, in which the structure is truncated at the limiting point defined by ray 3 in FIG. 29. The truncated angle $\phi$ is equal to 90-$\chi$ where $\chi$ is the angle between the normal to the smooth surface and the bisector of the apex angle as indicated on FIG. 31. The polar plot in FIG. 32 shows that the angular range for the truncated structure in which TIR occurs is significantly greater than the angular range for the non-truncated structure (FIG. 30). For the truncated structure TIR occurs for angles of incidence between 18-26° away from the normal when viewed perpendicularly to the long axes of the linear prisms (along arc 2).

The use of a truncated asymmetrical structure enables the tilt angle at which the "metallic" to transparent switch occurs to be controlled making the device more difficult to counterfeit and allows embodiments where different areas of the film could have different switch angles resulting in different parts of the device switching on and off as the device is tilted.

The use of asymmetrical prismatic structures is equally applicable to corner-cubes and hexagonal-faced corner-cubes. Corner-cube based structures are retroreflective and therefore the "metallic" state is best viewed when there is a light source directly behind the viewer. In most practical situations the person viewing the device will be positioned off-axis from the light source and will not easily observe the highly reflective "metallic" state. The use of asymmetric corner-cube based structures enables the divergence of the retroreflected light such that the "metallic" state can be viewed off-axis from the light source. This divergence can be achieved by having at least one facet of the corner-cube structure tilted at an angle that differs from the angle which would be required for all dihedral angles within the corner-cube structure to be orthogonal. For example one of the facets of an hexagonal corner-cube structure could be disposed at an angle of 50° to the base substrate and the other two facets disposed at an angle of 55° to the base substrate.

In the previous embodiments the customisation of the device is achieved by locally varying the orientation of the prismatic structure. In some cases this is not desirable due to the increased cost in generating the embossing tool. An alternative solution is to use a uniform prismatic structure with an additional light control structure on the opposite face of a carrier substrate to locally control the illumination of the light incident on and reflecting from the uniform prismatic structure. The light control structure should deflect the light passing through it such that light reflected by the prismatic film is seen at a different viewing angle than would otherwise be the case. Suitable light control structures are deflecting prismatic structures and diffraction gratings. The deflecting prismatic structures could be the same as those used to exhibit total internal reflection but without sufficient refractive index difference with the neighbouring material to totally reflect light on their own. For the case of diffraction gratings, the diffraction efficiency will have to be high if a highly reflective/metallic appearance is to be maintained. The customisation of the device is achieved by omitting or varying the light control structure in selected regions.

An example device construction is shown in FIG. 33. The construction comprises a substantially clear polymeric film of PET or the like. An array of parallel linear prisms is replicated on the far surface of the polymeric film such that it covers the whole active area of the device and is in the prisms-down configuration. A localised sawtooth type prismatic structure is replicated in the form of an image on the near surface of the polymeric film. The sawtooth structure is selected such that it shifts the angular range for which the film is exhibiting TIR and therefore has a "metallic" appearance. For the example in FIG. 33 the sawtooth structure has an inclined facet disposed at an angle of ~26° to the base substrate and the prism pitch is 20 μm and the prism height is 10 μm. The polar plots in FIG. 34 compares the angular range in which TIR occurs for the regions of device with the sawtooth structure and for regions without it. In this example the device comprises a sawtooth array with a refractive index of 1.5, a clear polymeric film with a refractive index of 1.5, a parallel linear prismatic array with a refractive index of 2.2 and an adhesive with a refractive index of 1.5. For the regions without the sawtooth structure TIR occurs for angles of incidence between normal incidence and 2-3° away from the normal when viewed perpendicularly to the long axes of the linear prisms (along arc 2). The sawtooth structure shifts the angular range at which TIR occurs to between 10-20° away from the normal when viewed perpendicularly to the long axes of the linear prisms (along arc 2).

The use of a sawtooth structure to locally control the illumination of the light hitting the prismatic array offers an advantage in that the required accuracy of the fidelity of the replication of the sawtooth structure is not as high as that required for the totally internally reflecting prismatic array and therefore it can be replicated using more conventional techniques such as hot embossing. In a further embodiment instead of applying the sawtooth structure in a localised pattern it could be applied over the whole surface and a coating applied over the sawtooth structure. The degree of deflection of the light passing through the sawtooth structure can be varied by changing the refractive index of the coating. For coatings with a lower refractive index than the sawtooth, the degree of deflection will be greatest for the non-coated structures and will decrease as the refractive index of the coating approaches the refractive index of the sawtooth structure. If the coating has the same refractive index as the sawtooth structure (i.e. an index matched coating) the effect of the sawtooth structure is negated. Customised regions can be created by locally applying the coating or applying two or more coatings in register with different refractive indices."

FIG. 35 shows a further example of a prismatic light control structure that can be used to modify the angular range over which a prismatic structure exhibits TIR and therefore has a "metallic" appearance. In this construction the light control structure is an array of parallel linear prisms in the prisms-up configuration and the prismatic array is an array of parallel linear prisms in the prisms-down configuration. The two arrays are oriented relative to each other such that their long axes are rotated by 90°. An adhesive/coating is applied to the prismatic array. The polar plots in FIG. 36 compares the angular range in which TIR occurs for a parallel array of linear prisms in the prisms-down configuration with and without the superimposed prismatic light control structure. The refractive index of the prismatic array is 1.9 and the refractive index of the adhesive is 1.5. The polar plot in FIG. **36*a* shows the angular range in which TIR occurs for an array of parallel linear prisms without the superimposed prismatic light control structure. It can be seen that TIR occurs within a very small range of obtuse angles. The polar plot in FIG. 36*b* shows the angular range at which TIR occurs for an array of parallel linear prisms, in the prisms-down configuration, superimposed with the prismatic light control structure as illustrated in FIG. 35**. It can be seen that the angular range at which TIR occurs has been significantly increased and has been shifted towards normal incidence such that the device does not now have to be viewed at such an obtuse angle to observe the "metallic" state.

In any of the embodiments described above a diffractive structure can be incorporated on to the facets of the totally internally reflecting prismatic structures. The zero order rays of the diffractive structure will be undeflected and will be transmitted or reflected by the prismatic film depending on the angle of incidence. The diffraction grating is designed such that at certain angles of illumination some of the diffractive rays are reflected and some are transmitted, for example red to orange may be reflected while yellow to violet is transmitted. The colours being reflected or transmitted will change as the angle of illumination is changed. This device combines the security of the prismatic film with the security of a diffractive device. If the prismatic film is customised to produce an image then the diffractive structure can be varied across the device to generate an image that is related visually to the prismatic film image.

An alternative method for generating an optically variable security device based on a prismatic film where different regions of the film exhibit a different optically variable effect is to locally vary the refractive index difference between the prismatic structures and the adjacent adhesive/coating layers. FIGS. 11 and 12 show that for both the prisms-down and prisms-up configuration the switching angles $\theta_{spu}$ and $\theta_{spd}$, for a certain rotational orientation, can be modified by varying the refractive index difference between the prisms and the adhesive/coating layer. The refractive index difference can be achieved by varying the refractive index of the prismatic material and/or the refractive index of the adhesive. The preferred method is to vary the refractive index of the adhesive/coating layer. An example device construction is shown in FIG. 37. The construction comprises a substantially clear polymeric film of PET or the like. An array of parallel linear prisms is replicated on the far surface of the polymeric film such that it covers the whole active area of the device. A first adhesive coating, adhesive 1, is applied to the array of parallel linear prisms in the form of an identifying image and a second adhesive coating, adhesive 2, is then applied in register to the non-image areas to form a composite adhesive layer. For the example shown the array of parallel linear prisms is in a prisms-down configuration when viewed from the top of the device and the linear prisms have a pitch of 20 μm and a prism height of 10 μm. The refractive index of the prism material is 2.2, the refractive index of adhesive 1 is 1.3 and the refractive index of adhesive 2 is 1.5. The polar plots in FIG. 38 compares the angular range in which TIR occurs for the regions of the device containing adhesive 1 and for regions containing adhesive 2. For the regions containing adhesive 1, with a refractive index difference of 0.9 between the adhesive and the prismatic material, TIR occurs for angles of incidence between normal incidence and 15-17° away from the normal when viewed perpendicularly to the long axes of the linear prisms (along arc 2). For the regions containing adhesive 2, with a refractive index difference of 0.7 between the adhesive and the prismatic material, TIR occurs for angles of incidence between normal incidence and 2-3° away from the normal when viewed perpendicularly to the long axes of the linear prisms (along arc 2). FIG. 39 shows an example switching sequence in which adhesive 1 has been applied in the shape of a star and adhesive 2 has been applied to form the background. At normal incidence both the star and the background are totally reflecting and the device appear "metallic" concealing the star. On tilting the device a few degrees off-axis (~5°) and viewing perpendicularly to the long axes of the linear prisms the background switches to substantially transparent but the star remains "metallic" and is therefore revealed. On tilting further off-axis, (~20°) the star also switches to substantially transparent and is hidden within a uniform transparent film.

The invention claimed is:

1. A security device comprising at least two regions, each region comprising a prismatic surface structure defining an array of substantially planar facets, wherein each region forms a reflector due to total internal reflection when viewed at least one first viewing angle and is transparent when viewed at least one second viewing angle, and wherein the said at least one first viewing angle of one region is different from the at least one first viewing angle of the other region.

2. A device according to claim 1, wherein the regions are provided on opposite sides of a substantially transparent layer.

3. A device according to claim 2, wherein the facets of the prisms of the prismatic surface structures taper towards each other in directions away from the substrate.

4. A device according to claim 2, wherein the regions are laterally offset so that when viewed at least one viewing angle, one region provides a reflective background to the other region.

5. A device according to claim 2, wherein the regions partially overlap.

6. A device according to claim 2, wherein the substrate comprises a laminate including a first layer providing the prismatic surface structure of one region and a second layer providing the surface prismatic structure of the other region, and a laminating adhesive between the layers.

7. A device according to claim 1, wherein the facets of the prisms of the prismatic surface structures taper towards each other in the same sense.

8. A device according to claim 7, wherein the regions are substantially coplanar, being formed on a same side of a substantially transparent layer.

9. A device according to claim 7, wherein each region is formed by a set of substantially parallel, linear prismatic structures, the lines of one array being angularly offset from those of the other array.

10. A device according to claim 9, wherein the lines of one array are orthogonal to the lines of the other array.

11. A device according to claim 1, wherein a uniform prismatic array is provided on one side of a substantially transparent layer and a control prismatic structure array on an opposite side of the layer such that the regions are defined by a variation in, or selected absence of, the control prismatic structure array.

12. A device according to claim 11, wherein each control prismatic structure array comprises a saw tooth structure.

13. A device according to claim 11, wherein one or more of the control prismatic structure arrays defines an image.

14. A device according to claim 11, wherein the control prismatic structure arrays are formed from respective portions of a uniform prismatic structure which has been selectively provided with a coating of a specified refractive index.

15. A device according to claim 11, wherein the control prismatic structure arrays are formed from respective portions of a uniform prismatic structure which has been selectively provided with an index matching coating.

16. A device according to claim 1, wherein the prismatic surface structures comprise regular arrays of substantially planar facets.

17. A device according to claim 1, wherein at least one viewing angle, or each array defined by said prismatic surface structure(s) is substantially transparent or totally reflecting.

18. A device according to claim 1, where a prismatic array is provided in combination with a coating such that the regions are defined by the variation in refractive index of the coating or the prismatic array.

19. A device according to claim 1, wherein one or more of the arrays is formed as a linear array of substantially parallel facets.

20. A device according to claim 19, wherein the pitch between the parallel facets is in the range 1-100 microns.

21. A device according to claim 19, wherein the facets extend at substantially 45° to the substrate and wherein an included angle between adjacent facets is substantially 90°.

22. A device according to claim 1, wherein one or more of the arrays is formed as a two-dimensional prismatic structure.

23. A device according to claim 22, wherein the two dimensional prismatic structure comprises a ruled array of tetrahedra or an array of square pyramids.

24. A device according to claim 23, wherein the facets are 1-100 microns across.

25. A device according to claim 23, wherein the facets extend at 45° to the substrate and wherein an included angle between adjacent facets is substantially 90°.

26. A device according to claim 22, wherein the two dimensional prismatic structure comprises an array of corner cube structures, or an array of hexagonal-faced corner-cubes.

27. A device according to claim 26, where the facets are 1-100 microns across.

28. A device according to claim 26, wherein the facets extend at 55° to the substrate and wherein an included angle between adjacent facets is substantially 90°.

29. A device according to claim 1, wherein the facets of the prismatic structures are substantially symmetrical with respect to a normal to the substrate.

30. A device according to claim 1, wherein the facets of the prismatic structures are arranged asymmetrically with respect to a normal to the substrate.

31. A device according to claim 30 wherein the facets are truncated.

32. A device according to claim 1, further comprising a transparent coating, such as an adhesive, covering the prismatic surface structure on one side of the device to enable the device to be adhered to an article, the adhesive having a lower refractive index than that of the prismatic structure.

33. A device according to claim 32, wherein the refractive index of the coating has different values at different locations across the substrate.

34. A device according to claim 32, wherein a difference between the refractive index of the prismatic structure and that of at least one of the adhesive and coating is at least 0.4.

35. A device according to claim 1, further comprising a coating extending across the prismatic surface structure on one side of the substrate, the coating having a lower refractive index than that of the prismatic structure; and a transparent adhesive provided on the coating to enable the security device to be adhered to an article.

36. A device according to claim 1, wherein a refractive index of the prismatic structure is at least 1.7, preferably at least 1.9.

37. A device according to claim 1, wherein the prismatic surface structures are formed from a polymer layer.

38. A device according to claim 37, wherein the prismatic structure is formed by UV casting.

39. A device according to claim 38, wherein the polymer comprises a photocrosslinkable acrylate, methacrylate or aromatic vinyl oligomeric resins.

40. A device according to claim 38, wherein the prismatic surface structure is made from an inorganic-organic hybrid incorporating high refractive index inorganic nanoparticles such as $TiO_2$.

41. A device according to claim 37, wherein the prismatic structure is formed by microembossing.

42. A device according to claim 41, wherein the polymer is selected from polyethylene teraphthalate (PET), polyethylene, polyamide, polycarbonate, poly(vinylchloride) (PVC), poly(vinylidenechloride) (PVdC), polymethylmethacrylate (PMMA), polyethylene naphthalate (PEN), polystyrene, polysulphone and polypropylene.

43. A device according to claim 1, further comprising a protective coating provided over an exposed surface of the device.

44. A device according to claim 1, further comprising printed indicia on the device.

45. A device according to claim 1, wherein at least one of the arrays defines an image or indicia.

46. A device according to claim 45, wherein the indicia comprise alphanumeric indicia.

47. A device according to claim 1, further comprising a diffractive structure provided over one or more of the prismatic surface structures.

48. An article of value provided with a security device according to claim 1.

49. An article according to claim 48, wherein the article comprises a document such as a document of value, for example a banknote.

50. An article according to claim 49, wherein the security device is incorporated as a security patch, stripe or thread in the document.

51. An article according to claim 50, wherein the thread is provided as a windowed thread.

52. An article according to claim 51, wherein a transparent adhesive is provided on both sides of the security device.

53. An article according to claim 50, wherein the device defines images extending along the security thread.

54. An article according to claim 49, wherein the security device is incorporated into the document such that the device is viewable from both sides of the document.

55. An article according to claim 49, wherein one or more of the arrays define indicia related to indicia on the document.

56. An article according to claim 55, wherein the indicia defined by the array(s) duplicate indicia on the document.

57. An article according to claim 55, wherein the indicia defined by one or more of the arrays cooperate with indicia on the document to define a composite pattern or image.

58. An article according to claim 48, wherein the security device is arranged over indicia on a document.

59. An article according to claim 58, wherein the security device defines blocks corresponding to each array which selectively permit viewing of underlying indicia dependent upon viewing angle.

60. An article according to claim 48, wherein the security device is provided in a transparent area of the article.

* * * * *